(12) United States Patent
Mortensen et al.

(10) Patent No.: US 11,617,006 B1
(45) Date of Patent: *Mar. 28, 2023

(54) SYSTEM AND METHOD FOR CAPTURING AUDIO OR VIDEO DATA

(71) Applicant: United Services Automobile Association (USAA), San Antonio, TX (US)

(72) Inventors: Maland Mortensen, San Antonio, TX (US); Bradly Billman, Celina, TX (US); Cleburne Robinson Burgess, Fair Oaks Ranch, TX (US)

(73) Assignee: UNITED SERVICES AUTOMOBILE ASSOCIATES (USAA), San Antonio, TX (US)

(*) Notice: Subject to any disclaimer, the term of this patent is extended or adjusted under 35 U.S.C. 154(b) by 44 days.

This patent is subject to a terminal disclaimer.

(21) Appl. No.: 17/349,240

(22) Filed: Jun. 16, 2021

Related U.S. Application Data

(63) Continuation of application No. 16/674,366, filed on Nov. 5, 2019, now Pat. No. 11,070,868, which is a
(Continued)

(51) Int. Cl.
*H04N 21/4335* (2011.01)
*H04N 5/91* (2006.01)
(Continued)

(52) U.S. Cl.
CPC ......... *H04N 21/4335* (2013.01); *G06V 20/41* (2022.01); *G06V 40/10* (2022.01);
(Continued)

(58) Field of Classification Search
CPC ...... H04N 21/4335; H04N 5/91; G06V 40/10; G06V 20/41; G06V 20/44;
(Continued)

(56) References Cited

U.S. PATENT DOCUMENTS 5,890,141 A 3/1999 Carney et al.
5,903,904 A 5/1999 Peairs
(Continued)

FOREIGN PATENT DOCUMENTS

CA 2619884 3/2007
CN 1897644 A 1/2007
(Continued)

OTHER PUBLICATIONS

Bieniecki, Wojciech et al. "Image Preprocessing for Improving OCR Accuracy", Computer Engineering Department, Technical University of Lodz, al. Politechniki 11, Lodz Poland, May 23, 2007.
(Continued)

*Primary Examiner* — Thai Q Tran
*Assistant Examiner* — Jose M Mesa
(74) *Attorney, Agent, or Firm* — Crowell & Moring, L.L.P.

(57) ABSTRACT

Methods and systems for managing data storage strategies for continuous video segment recordings on a video recording device are disclosed. The data storage strategies include the detection of various trigger events and ending events detected from the video recordings or measurements detected from sensor devices that are included in the video recording device.

19 Claims, 11 Drawing Sheets

Related U.S. Application Data continuation of application No. 15/378,710, filed on Dec. 14, 2016, now Pat. No. 10,506,281.

(60) Provisional application No. 62/271,057, filed on Dec. 22, 2015.

(51) Int. Cl.
  *G06V 40/10* (2022.01)
  *G11B 20/10* (2006.01)
  *G06V 20/40* (2022.01)

(52) U.S. Cl.
  CPC ......... *G11B 20/10527* (2013.01); *H04N 5/91* (2013.01); *G06V 20/44* (2022.01); *G11B 2020/10537* (2013.01); *G11B 2020/10851* (2013.01); *G11B 2020/10898* (2013.01)

(58) Field of Classification Search
  CPC .... G11B 20/10527; G11B 2020/10537; G11B 2020/10851; G11B 2020/10898
  See application file for complete search history.

(56) References Cited

U.S. PATENT DOCUMENTS

| | | |
|---|---|---|
| 5,930,501 A | 7/1999 | Neil |
| 6,005,623 A | 12/1999 | Takahashi |
| 6,195,452 B1 | 2/2001 | Royer |
| 6,315,195 B1 | 11/2001 | Ramachandran |
| 6,668,372 B1 | 12/2003 | Wu |
| 6,930,718 B2 | 8/2005 | Parulski et al. |
| 7,296,734 B2 | 11/2007 | Pliha |
| 7,647,897 B2 | 1/2010 | Jones |
| 7,766,223 B1 | 8/2010 | Mello |
| 7,865,425 B2 | 1/2011 | Waelbroeck |
| 7,873,556 B1 | 1/2011 | Dolan |
| 7,974,869 B1 | 7/2011 | Sharma |
| 8,009,931 B2 | 8/2011 | Li |
| 8,064,729 B2 | 11/2011 | Li |
| 8,118,654 B1 | 2/2012 | Nicolas |
| 8,131,636 B1 | 3/2012 | Viera et al. |
| 8,396,623 B2 | 3/2013 | Maeda et al. |
| RE44,274 E | 6/2013 | Popadic et al. |
| 8,483,473 B2 | 7/2013 | Roach |
| 8,531,518 B1 | 9/2013 | Zomet |
| 8,582,862 B2 | 11/2013 | Nepomniachtchi et al. |
| 8,768,836 B1 | 7/2014 | Acharya |
| 8,818,033 B1 | 8/2014 | Liu |
| 8,824,772 B2 | 9/2014 | Viera |
| 8,929,640 B1 | 1/2015 | Mennie et al. |
| 9,195,986 B2 | 11/2015 | Christy et al. |
| 9,235,860 B1 | 1/2016 | Boucher et al. |
| 9,270,804 B2 | 2/2016 | Dees et al. |
| 9,384,409 B1 | 7/2016 | Ming |
| 9,387,813 B1 | 7/2016 | Moeller et al. |
| 9,524,269 B1 | 12/2016 | Brinkmann et al. |
| 9,613,467 B2 | 4/2017 | Roberts et al. |
| 9,613,469 B2 | 4/2017 | Fish et al. |
| 9,824,453 B1 | 11/2017 | Collins et al. |
| 10,157,326 B2 | 12/2018 | Long et al. |
| 10,210,767 B2 | 2/2019 | Johansen |
| 10,217,375 B2 | 2/2019 | Waldron |
| 10,402,944 B1 | 9/2019 | Pribble et al. |
| 10,460,295 B1 | 10/2019 | Oakes, III et al. |
| 10,482,432 B1 | 11/2019 | Oakes, III et al. |
| 10,818,282 B1 | 10/2020 | Clauer Salyers |
| 10,956,879 B1 | 3/2021 | Eidson |
| 11,030,752 B1 | 6/2021 | Backlund |
| 11,042,940 B1 | 6/2021 | Limas |
| 11,042,941 B1 | 6/2021 | Limas |
| 11,062,130 B1 | 7/2021 | Medina, III |
| 11,062,131 B1 | 7/2021 | Medina, III |
| 11,062,283 B1 | 7/2021 | Prasad |
| 11,064,111 B1 | 7/2021 | Prasad |
| 11,068,976 B1 | 7/2021 | Voutour |
| 11,070,868 B1 | 7/2021 | Mortensen |
| 11,121,989 B1 | 9/2021 | Castinado |
| 11,182,753 B1 | 11/2021 | Oakes, III et al. |
| 11,222,315 B1 | 1/2022 | Prasad et al. |
| 11,232,517 B1 | 1/2022 | Medina et al. |
| 11,250,398 B1 | 2/2022 | Prasad et al. |
| 11,288,898 B1 | 3/2022 | Moon |
| 11,328,267 B1 | 5/2022 | Medina, III |
| 2001/0020949 A1 | 9/2001 | Gong et al. |
| 2001/0030695 A1 | 10/2001 | Prabhu et al. |
| 2001/0051965 A1 | 12/2001 | Guillevic |
| 2002/0075380 A1 | 6/2002 | Seeger et al. |
| 2002/0116335 A1 | 8/2002 | Star |
| 2002/0145035 A1 | 10/2002 | Jones |
| 2002/0152169 A1 | 10/2002 | Dutta |
| 2002/0154815 A1 | 10/2002 | Mizutani |
| 2002/0172516 A1 | 11/2002 | Aoyama |
| 2003/0046223 A1 | 3/2003 | Crawford |
| 2003/0051138 A1 | 3/2003 | Maeda et al. |
| 2003/0081121 A1 | 5/2003 | Swan |
| 2003/0097592 A1 | 5/2003 | Adusumilli |
| 2003/0119478 A1 | 6/2003 | Nagy et al. |
| 2003/0200107 A1 | 10/2003 | Allen et al. |
| 2003/0213841 A1 | 11/2003 | Josephson et al. |
| 2004/0010803 A1 | 1/2004 | Berstis |
| 2004/0061913 A1 | 4/2004 | Takiguchi |
| 2004/0066419 A1 | 4/2004 | Pyhalammi |
| 2004/0136586 A1 | 7/2004 | Okamura |
| 2004/0193878 A1 | 9/2004 | Dillinger et al. |
| 2004/0201695 A1 | 10/2004 | Inasaka |
| 2004/0202349 A1 | 10/2004 | Erol et al. |
| 2004/0217170 A1 | 11/2004 | Takiguchi et al. |
| 2004/0238619 A1 | 12/2004 | Nagasaka et al. |
| 2004/0267665 A1 | 12/2004 | Nam et al. |
| 2005/0001924 A1 | 1/2005 | Honda |
| 2005/0015341 A1 | 1/2005 | Jackson |
| 2005/0034046 A1 | 2/2005 | Berkmann |
| 2005/0078192 A1 | 4/2005 | Sakurai |
| 2005/0102208 A1 | 5/2005 | Gudgeon |
| 2005/0128333 A1 | 6/2005 | Park |
| 2005/0133586 A1 | 6/2005 | Rekeweg et al. |
| 2005/0144131 A1 | 6/2005 | Aziz |
| 2005/0157174 A1 | 7/2005 | Kitamura et al. |
| 2005/0165641 A1 | 7/2005 | Chu |
| 2005/0198364 A1 | 9/2005 | Val et al. |
| 2005/0205660 A1 | 9/2005 | Munte |
| 2005/0216409 A1 | 9/2005 | McMonagle et al. |
| 2005/0238257 A1 | 10/2005 | Kaneda et al. |
| 2005/0273430 A1 | 12/2005 | Pliha |
| 2005/0281450 A1 | 12/2005 | Richardson |
| 2006/0026140 A1 | 2/2006 | King |
| 2006/0171697 A1 | 2/2006 | Nijima |
| 2006/0071950 A1 | 4/2006 | Kurzweil et al. |
| 2006/0077941 A1 | 4/2006 | Alagappan et al. |
| 2006/0112013 A1 | 5/2006 | Maloney |
| 2006/0124728 A1 | 6/2006 | Kotovich et al. |
| 2006/0186194 A1 | 8/2006 | Richardson |
| 2006/0229987 A1 | 10/2006 | Leekley |
| 2006/0255124 A1 | 11/2006 | Hoch |
| 2006/0270421 A1 | 11/2006 | Phillips |
| 2007/0005467 A1 | 1/2007 | Haigh et al. |
| 2007/0030363 A1 | 2/2007 | Cheatle et al. |
| 2007/0058874 A1 | 3/2007 | Tabata et al. |
| 2007/0116364 A1 | 5/2007 | Kleihorst et al. |
| 2007/0118747 A1 | 5/2007 | Pintsov et al. |
| 2007/0130063 A1 | 6/2007 | Jindia |
| 2007/0136078 A1 | 6/2007 | Plante |
| 2007/0244811 A1 | 10/2007 | Tumminaro |
| 2008/0013831 A1 | 1/2008 | Aoki |
| 2008/0040280 A1 | 2/2008 | Davis |
| 2008/0069427 A1 | 3/2008 | Liu |
| 2008/0140552 A1 | 6/2008 | Blaikie |
| 2008/0192129 A1 | 8/2008 | Walker |
| 2008/0250196 A1* | 10/2008 | Mori ................. H04N 21/4184 711/E12.083 |
| 2009/0171723 A1 | 7/2009 | Jenkins |
| 2009/0176511 A1 | 7/2009 | Morrison |
| 2009/0222347 A1 | 9/2009 | Whitten |

(56) References Cited

U.S. PATENT DOCUMENTS

| | | |
|---|---|---|
| 2009/0240574 A1 | 9/2009 | Carpenter |
| 2010/0008579 A1 | 1/2010 | Smirnov |
| 2010/0016016 A1 | 1/2010 | Brundage et al. |
| 2010/0038839 A1 | 2/2010 | DeWitt et al. |
| 2010/0069093 A1 | 3/2010 | Morrison |
| 2010/0069155 A1 | 3/2010 | Schwartz |
| 2010/0076890 A1 | 3/2010 | Low |
| 2010/0112975 A1 | 5/2010 | Sennett |
| 2010/0161408 A1 | 6/2010 | Karson |
| 2010/0201711 A1 | 8/2010 | Fillion et al. |
| 2010/0262607 A1 | 10/2010 | Vassilvitskii |
| 2010/0287250 A1 | 11/2010 | Carlson |
| 2011/0015963 A1 | 1/2011 | Chafle |
| 2011/0016109 A1 | 1/2011 | Vassilvitskii |
| 2011/0054780 A1 | 3/2011 | Dhanani |
| 2011/0082747 A1 | 4/2011 | Khan |
| 2011/0083101 A1 | 4/2011 | Sharon |
| 2011/0105092 A1 | 5/2011 | Felt |
| 2011/0112985 A1 | 5/2011 | Kocmond |
| 2012/0036014 A1 | 2/2012 | Sunkada |
| 2012/0052874 A1 | 3/2012 | Kumar |
| 2012/0098705 A1 | 4/2012 | Yost |
| 2012/0109793 A1 | 5/2012 | Abeles |
| 2012/0113489 A1 | 5/2012 | Heit et al. |
| 2012/0150767 A1 | 6/2012 | Chacko |
| 2012/0230577 A1 | 9/2012 | Calman et al. |
| 2012/0296768 A1 | 11/2012 | Fremont-Smith |
| 2013/0021651 A9 | 1/2013 | Popadic et al. |
| 2013/0155474 A1 | 6/2013 | Roach et al. |
| 2013/0191261 A1 | 7/2013 | Chandler |
| 2013/0201534 A1 | 8/2013 | Carlen |
| 2013/0324160 A1 | 12/2013 | Sabatellil |
| 2013/0332004 A1 | 12/2013 | Gompert et al. |
| 2013/0332219 A1 | 12/2013 | Clark |
| 2013/0346306 A1 | 12/2013 | Kopp |
| 2013/0346307 A1 | 12/2013 | Kopp |
| 2014/0010467 A1 | 1/2014 | Mochizuki et al. |
| 2014/0032406 A1 | 1/2014 | Roach et al. |
| 2014/0037183 A1 | 2/2014 | Gorski et al. |
| 2014/0156501 A1 | 6/2014 | Howe |
| 2014/0197922 A1 | 7/2014 | Stanwood et al. |
| 2014/0203508 A1 | 7/2014 | Pedde |
| 2014/0207673 A1 | 7/2014 | Jeffries |
| 2014/0207674 A1 | 7/2014 | Schroeder |
| 2014/0244476 A1 | 8/2014 | Shvarts |
| 2014/0313335 A1 | 10/2014 | Koravadi |
| 2014/0351137 A1 | 11/2014 | Chisholm |
| 2014/0374486 A1 | 12/2014 | Collins, Jr. |
| 2015/0134517 A1 | 5/2015 | Cosgray |
| 2015/0235484 A1 | 8/2015 | Kraeling et al. |
| 2015/0244994 A1 | 8/2015 | Jang et al. |
| 2015/0294523 A1 | 10/2015 | Smith |
| 2015/0348591 A1* | 12/2015 | Kaps ............... G11B 27/17 386/201 |
| 2016/0026866 A1 | 1/2016 | Sundaresan |
| 2016/0034590 A1 | 2/2016 | Endras et al. |
| 2016/0142625 A1 | 5/2016 | Weksler et al. |
| 2016/0189500 A1 | 6/2016 | Kim et al. |
| 2016/0335816 A1 | 11/2016 | Thoppae et al. |
| 2017/0039637 A1 | 2/2017 | Wandelmer |
| 2017/0068421 A1 | 3/2017 | Carlson |
| 2017/0132583 A1 | 5/2017 | Nair |
| 2017/0146602 A1 | 5/2017 | Samp et al. |
| 2017/0229149 A1* | 8/2017 | Rothschild ............ G16H 40/63 |
| 2017/0263120 A1 | 9/2017 | Durie, Jr. et al. |
| 2017/0033761 A1 | 11/2017 | Beguesse |
| 2018/0108252 A1 | 4/2018 | Pividori |
| 2018/0197118 A1 | 7/2018 | McLaughlin |
| 2019/0026577 A1 | 1/2019 | Hall et al. |
| 2019/0122222 A1 | 4/2019 | Uechi |
| 2021/0097615 A1 | 4/2021 | Gunn, Jr. |

FOREIGN PATENT DOCUMENTS

| | | |
|---|---|---|
| CN | 1967565 A | 5/2007 |
| EP | 0984410 | 3/2000 |
| JP | 2004-23158 | 1/2004 |
| JP | 3708807 | 10/2005 |
| WO | WO 96/14707 A1 | 5/1996 |
| WO | WO 01/61436 | 8/2001 |
| WO | WO 2005/043857 | 5/2005 |
| WO | WO 2007/024889 | 3/2007 |

OTHER PUBLICATIONS

Shaikh, Aijaz Ahmed et al., "Auto Teller Machine (ATM) Fraud—Case Study of Commercial Bank in Pakistan", Department of Business Administration, Sukkur Institute of Business Administration, Sukkur, Pakistan, Aug. 5, 2012.

Tiwari, Rajnish et al., "Mobile Banking as Business Strategy", IEEE Xplore, Jul. 2006.

Lyn C. Thomas, "A survey of credit and behavioural scoring: forecasting financial risk of lending to consumers", International Journal of Forecasting, (Risk) (2000).

Non-Final Office Action issued on U.S. Appl. No. 14/293,159 dated Aug. 11, 2022.

Non-Final Office Action issued on U.S. Appl. No. 16/455,024 dated Sep. 7, 2022.

Non-Final Office Action issued on U.S. Appl. No. 17/071,678 dated Sep. 14, 2022.

Non-Final Office Action issued on U.S. Appl. No. 17/180,075 dated Oct. 4, 2022.

Non-Final Office Action issue on U.S. Appl. No. 17/511,822 dated Sep. 16, 2022.

Non-Final Office Action issued on U.S. Appl. No. 17/568,849 dated Oct. 4, 2022.

Yong Gu Ji et al., "A Usability Checklist for the Usability Evaluation of Mobile Phone User Interface", International Journal of Human-Computer Interaction, 20(3), 207-231 (2006).

Printout of news article dated Feb. 13, 2008, announcing a Nokia phone providing audio cues for capturing a document image.

IPR Petition 2022-01593, *Truist Bank* v. *United Services Automobile Association* filed Oct. 11, 2022.

Fletcher, Lloyd A., and Rangachar Kasturi, "A robust algorithm for text, string separation from mixed text/graphics images", IEEE transactions on pattern analysis and machine intelligence 10.6 (1988), 910-918 (1988).

IPR 2022-00076 filed Nov. 17, 2021 on behalf of PNC Bank N.A., 98 pages.

IPR 2022-00075 filed Nov. 5, 2021 on behalf of PNC Bank N.A., 90 pages.

IPR 2022-00050 filed Oct. 22, 2021 on behalf of PNC Bank N.A., 126 pages.

IPR 2022-00049 filed Oct. 22, 2021 on behalf of PNC Bank N.A., 70 pages.

*About Network Servers*, GlobalSpec (retrieved from https//web.archive.or/web/20051019130842/http://qlobalspec.com 80/LearnMore/Networking_Communication_Equipment/Networking_Equipment/Network_Servers ("GlobalSpec").

FDIC: Check Clearing for the 21$^{st}$ Century act (Check21), FED. Deposit Ins. Corp., Apr. 25, 2016 (retrieved from https://web.archive.org/web/20161005124304/https://www.fdic.gov/consumers/assistance/protection/check21.html ("FDIC").

Andrew S. Tanenbaum, Modern Operating Systems, Second Edition (2001).

Arnold et al, The Java Programming Language, Fourth Edition (2005).

Consumer Assistance & Information—Check 21 https://www.fdic.gov/consumers/assistance/protection/check21.html (FDIC).

Halonen et al., GSM, GPRS, and EDGE Performance: Evolution Towards 3G/UMTS, Second Edition (2003).

Heron, Advanced Encryption Standard (AES), 12 Network Security 8 (2009).

(56) References Cited

OTHER PUBLICATIONS

Immich et al., Performance Analylsis of Five Interprocess CommunicAtion Mechanisms Across UNIX Operating Systems, 68 J. Syss. & Software 27 (2003).
Leach, et al., A Universally Unique Identifier (UUID) URN Namespace, (Jul. 2005) retrieved from https://www.ietf.org/rfc/rfc4122.txt.
N. Ritter & M. Ruth, The Geo Tiff Data InterchAnge Standard for Raster Geographic Images, 18 Int. J. Remote Sensing 1637 (1997). Pbmplus—image file format conversion package, retrieved from https://web.archive.org/web/20040202224728/https:/www.acme.com/software/pbmplus/.
Petition filed by PNC Bank N.A. for Inter Partes Review of Claims 1-23 of U.S. Pat. No. 10,482,432, dated Jul. 14, 2021, IPR2021-01071, 106 pages.
Petition filed by PNC Bank N.A. for Inter Partes Review of Claims 1-7, 10-21 and 23 of U.S. Pat. No. 10,482,432, dated Jul. 14, 2021, IPR2021-01074.
Petition filed by PNC Bank N.A. for Inter Partes Review of Claims 1-18 of U.S. Pat. No. 10,621,559, dated Jul. 21, 2021, IPR2021-01076, 111 pages.
Petition filed by PNC Bank N.A. for Inter Partes Review of Claims 1-18 of U.S. Pat. No. 10,621,559, filed Jul. 21, 2021, IPR2021-01077; 100 pages.
Petition filed by PNC Bank N.A. for Inter Partes Review of Claims 1-30 of U.S. Pat. No. 10,013,681, filed Aug. 27, 2021, IPR2021-01381, 127 pages.
Petition filed by PNC Bank N.A. for Inter Partes Review of U.S. Pat. No. 10,013,605, filed Aug. 27, 2021, IPR2021-01399, 113 pages.
Readdle, Why Scanner Pro is Way Better Than Your Camera? (Jun. 27, 2016) retrieved from https://readdle.com/blog/why-scanner-pro-is-way-better-than-your-camera.
Santomero, The Evolution of Payments in the U.S.: Paper vs. Electronic (2005) retrieved from https://web.archive.org/web/20051210185509/https://www.philadelphiafed.org/publicaffairs/speeches/2005_santomero9.html.
Schindler, Scanner Pro Review (Dec. 27, 2016) retrieved from https://www.pcmag.com/reviews/scAnner-pro.
Sing Li & Jonathan Knudsen, Beginning J2ME: From Novice to Professional, Third Edition (2005), ISBN (pbk): 1-59059-479-7, 468 pages.
Wang, Ching-Lin et al. "Chinese document image retrieval system based on proportion of black pixel area in a character image", the 6th International Conference on Advanced Communication Technology, 2004, vol. 1, IEEE, 2004.
Zaw, Kyi Pyar and Zin Mar Kyu, "Character Extraction and Recognition for Myanmar Script Signboard Images using Block based Pixel Count and Chain Codes" 2018 IEEE/ACIS 17th International Conference on Computer and Information Science (CS), IEEE, 2018.
Jung et al, "Rectangle Detection based on a Windowed Hough Transform", IEEE Xplore, 2004, 8 pgs.
Craig Vaream, "Image Deposit Solutions" Emerging Solutions for More Efficient Check Processing, Nov. 2005, 16 pages.
Certificate of Accuracy related to Article entitled, "Deposit checks by mobile" on webpage: https://www.elmundo.es/navegante/2005/07/21/empresas/1121957427.html signed by Christian Paul Scrogum (translator) on Sep. 9, 2021.
Bruno-Britz, Maria "Mitek Launches Mobile Phone Check Capture Solution," Bank Systems and Technologies Information Week (Jan. 24, 2008).
V User Guide, https://www.lg.com/us/support/manualsdocuments?customerModelCode=%20LGVX9800&csSalesCode=LGVX9800, select"VERISON(USA) en"; The V_UG_051125.pdf.
MING Phone User Manual, 2006.
Patel, Kunur, "How Mobile Technology is Changing Banking's Future" AdAge, Sep. 21, 2009, 4 pages.
Spencer, Harvey, "Controlling Image Quality at the Point of Capture" Check 21, Digital Check Corporation & HSA 2004.
Moseik, Celeste K., "Customer Adoption of Online Restaurant Services: A MultiChannel Approach", Order No. 1444649 University of Delaware, 2007, Ann Arbor: ProQuest., Web. Jan. 10, 2022 (Year: 2007).
ANS X9.100-160-1-2004, Part 1: Placement and Location of Magnetic Ink Printing (MICR), American National Standard for Financial Services, approved Oct. 15, 2004.
Clancy, Heather, "Turning cellphones into scanners", The New York Times, Feb. 12, 2005; https://www.nytimes.com/2005/02/12/business/worldbusiness/turning-cellphones-into-scanners.html.
Consumer Guide to Check 21 and Substitute Checks, The Federal Reserve Board, The Wayback Machine—Oct. 28, 2004 https://web.archive.org/20041102233724/http://www.federalreserve.gov.
Curtin, Denis P., A Short Course in Digital Photography Chapter 7 Graphic File Formats.
Dance, Christopher, "Mobile Document Imaging", Xerox, Research Centre Europe, XRCE Image Processing Area, Nov. 2004.
Digital Photography Now, Nokia N73 Review, Oct. 28, 2006.
Federal Reserve System, 12 CFR Part 229, Regulation CC: Docket No. R-1176, Availability of Funds and Collection of Checks, Board of Governors of the Federal Reserve System Final rule.
Financial Services Policy Committee, Federal Reserve Banks Plan Black-and-White Image Standard and Quality Checks, May 18, 2004.
MICR-Line Issues Associated With The Check 21 Act and the Board's Proposed Rule, Prepared by Federal Reserve Board Staff, Apr. 27, 2004.
Microsoft Computer Dictionary Fifth Edition—Copyright 2002.
HTTP Over TLS, Network Working Group, May 2000, Memo.
Nokia N73—Full phone specifications.
Ranjan, Amit, "Using a Camera with Windows Mobile 5", Jul. 21, 2006.
Reed, John, "FT.com site: Mobile users branch out", ProQuest, Trade Journal, Oct. 6, 2005.
Weiqui Luo et al., "Robust Detection of Region-Duplication Forgery in Digital Image" Guoping Qui, School of Computer Science, University of Nottingham, NG8 1 BB, UK—Jan. 2006.
Final Written Decision relating to U.S. Pat. No. 8,699,779, IPR2021-01070, Jan. 19, 2023.
Final Written Decision relating to U.S. Pat. No. 8,877,571, IPR2021-01073, Jan. 19, 2023.
Final Written Decision relating to U.S. Pat. No. 10,621,559, IPR2021-01077, Jan. 20, 2023.

\* cited by examiner

SYSTEM AND METHOD FOR CAPTURING AUDIO OR VIDEO DATA

CROSS-REFERENCE TO RELATED APPLICATIONS

This application is a continuation of U.S. patent application Ser. No. 16/674,366, filed Nov. 5, 2019, which is a continuation of U.S. patent application Ser. No. 15/378,710 (now U.S. Pat. No. 10,506,281), filed on Dec. 14, 2016, which claims benefit to U.S. Provisional Patent Application No. 62/271,057, filed Dec. 22, 2015, the entirety of all of which are hereby incorporated by reference herein.

BACKGROUND

The recording of personally significant events through video and/or audio recording devices is a common occurrence. Typically, recordings of organized events, such as a surprise party or a piano recital, may be planned for in advance and the recording devices prepared ahead of time for the best position and amount of recording media appropriate for the event. However, many everyday events tend not to take place on a schedule or begin on command. Also, the significance of a given event may not be recognized until after that event has already started to unfold. To keep track of everything that happens to or around a person on a given day, one could carry camera and attempt to bring that camera out quickly to capture a particular moment or event. Taking out the recording device too late or the recording device being at a location just out of reach is a common issue with spontaneous events. Alternatively, a recording device may be positioned at a location that seems likely to capture interesting events and left on continuously during the hours that something of interest might occur. This latter approach to capturing more spontaneous events may run into the problem of not having the recording device in quite the right location and the expense of the large amounts of recording media needed or large amount of time needed to manually review the unattended recording.

SUMMARY

According to one aspect, a video recording apparatus is disclosed. The video recording apparatus may comprise a video recorder configured to record video data, a memory configured to store the video data, and a processor in communication with the memory. The processor may be configured to control storage of the video data in a video segment on the memory, determine whether a trigger event is detected during storage of the video data in the video segment, and in response to detecting the trigger event during storage of the video data in the video segment, flag at least a portion of the video segment for preservation, and implement a trigger event protocol.

According to another aspect, a method for recording continuous video segments is disclosed. The method may comprise controlling a video recorder to record video data, and controlling a processor to store the video data in a video segment on a memory, determine whether a trigger event is detected during storage of the video data in the video segment, and in response to detecting the trigger event during storage of the video data in the video segment, flag at least a portion of the video segment for preservation and implement a trigger event protocol.

DESCRIPTION OF THE FIGURES

The present disclosure may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The methods, devices, and systems discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

In order to capture spontaneous events without the distraction of manually handling a camera, and without the risk of missing the beginning of an event, a wearable recording device is disclosed. According to some embodiments, the wearable recording device is a pair of glasses including a digital video recording component for recording events and objects from the user's point of view through the glasses. The wearable glasses embodiment is advantageous for recording events and objects from the user's own viewing field. In other words, events that are viewable by the user may be recorded by the digital video recording component of the wearable glasses. According to other embodiments, the wearable recording device may be attached to other locations on the user's body to enable the digital video recording component to record events and objects surrounding the user.

Figure 1:
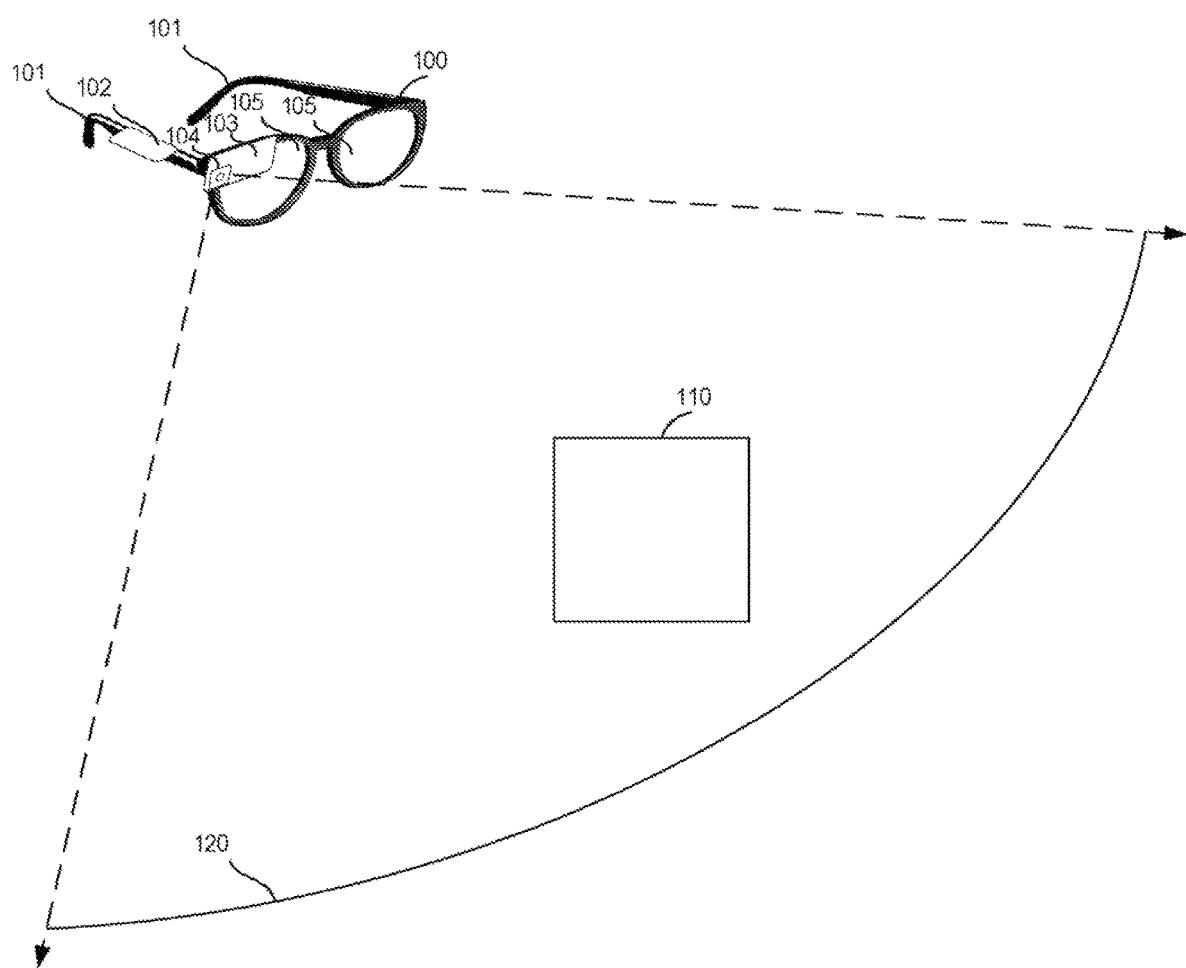
FIG. 1 illustrates an exemplary wearable recording device in which exemplary embodiments and aspects may be implemented.

FIG. 1 illustrates a wearable recording device 100 that may, for example, take the form of eye wear configured to be worn over a user's eyes (for example, Google® glasses). The wearable recording device 100 may include any combination of the components illustrated in FIG. 1, including arm portions 101, a computing system 102, a display unit 103, a camera unit 104, and lenses 105. The components of wearable recording device 100 may include one or more components described in computer 700 illustrated in FIG. 7, as will be described in further detail below.

The components of wearable recording device 100 may be integrated into wearable recording device 100, or may be discrete elements removably attached to wearable recording device 100. The electrical components of wearable recording device 100 (e.g., computing system 102, display unit 103, and camera unit 104) may be configured to communicate with each other via wired or wireless communication protocols.

In particular, arm portions 101 may be configured to wrap, at least in part, around a user's ears. Computing system 102 may include one or more components described in computer 700 illustrated in FIG. 7. For example, computing system 102 may include a memory configured to store instructions, a processor configured to execute the instructions stored on the memory to implement one or more processes described herein, a network interface for communicating with other electronic devices within a network, and one or more input devices such as a scroll wheel, button(s), or touchpad for receiving user inputs. Display unit 103 may display or project information within the user's field of view. Lenses 105 may be prescription or non-prescription lenses made out of glass or a plastic based polymer, and allows the user to focus on objects (e.g. object 110) within the user's field of view. And camera unit 104 may capture image data within camera unit 104's field of view 120. The image data captured by camera unit 104 may include digital images and/or digital video. Images captured by camera unit 104 may include most, if not all, of the user's field of view through lenses 105. For example, camera unit 104 may capture image(s) of object 110 within camera unit 104's field of view. Digital image(s) and digital video(s) recorded by camera unit 104 may be stored in a memory of computing system 102.

Camera unit 104 may support capture of image data digitally, in analog, and/or according to any number of lossy or lossless image or video formats, such as Joint Photographic Experts Group (jpeg or jpg), Tagged Image File Format (tiff), Portable Network Graphics (png), Graphics Interchange Format (gif), Moving Picture Experts Group (mpeg, mpeg-2), or any other image or video file format. Camera unit 104 may also support capture image data for various forms of image, such as ultra-violet images, infrared images, night vision, thermal scans, and more.

Figure 2:
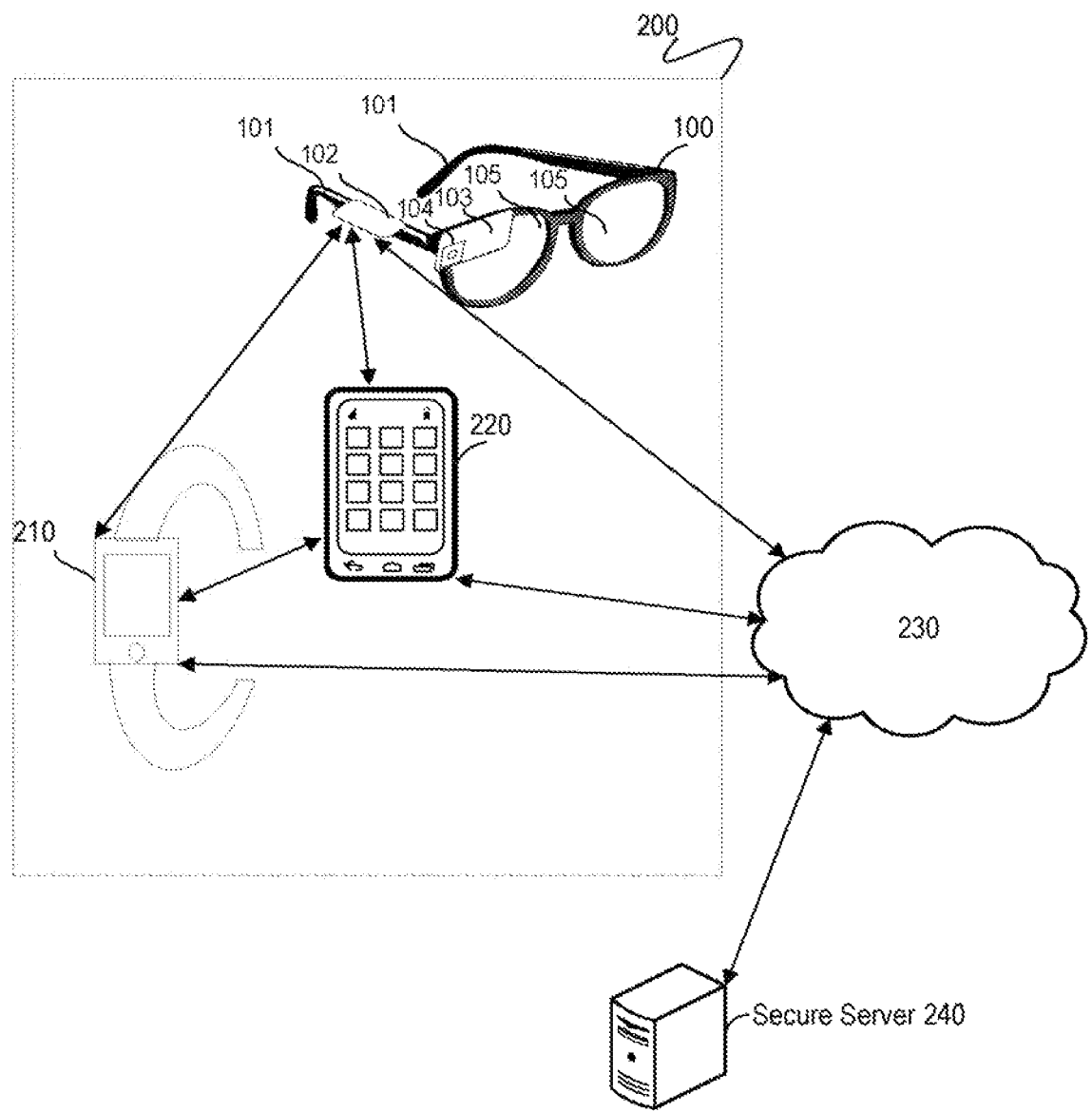
FIG. 2 illustrates an exemplary system of wearable devices and other computer devices in communication with the wearable devices, including the wearable recording device in FIG. 1, according to some embodiments.

Referring to FIG. 2, wearable recording device 100 may be in wireless communication with other wearable and/or portable devices to form a local user-based network system 200. The user-based network system 200 illustrated in FIG. 2 includes wearable recording device 100, smart watch 210, and smart phone 220. Each of the devices within user-based network system 200 may communicate with each other either directly or indirectly via another device within the user-based network system 200. Each of the devices within user-based network system 200 may also communicate with secure server 240, either directly or indirectly through another device within the user-based network system 200, via network 230.

Smart watch 210 may be configured to support wireless communication (e.g. cellular, Wi-Fi, Bluetooth, NFC, etc.) capabilities and data processing and memory abilities. The components of smart watch 210 may include one or more components described in computer 700 illustrated in FIG. 7. For example, smart watch 210 may include a camera, display, accelerometer, gyroscope, and one or more biometric sensors for sensing a biometric reading of the user (e.g., user's body temperature, user's heartbeat, etc.). A more detailed description of the components that may comprise smart watch 210 is provided below with reference to FIG. 7. When communication between wearable recording device 100 and smart watch 210 is established, wearable recording device 100 may receive data obtained by smart watch 210. For example, digital images or digital videos recorded by smart watch 210 may be transmitted to wearable recording device 100 and stored on a memory of wearable recording device 100. Wearable recording device 100 may also receive information obtained by smart watch 210 such as audio information obtained through a microphone on smart watch 210, acceleration information sensed by the accelerometer on smart watch 210, orientation information sensed by the gyroscope of the smart watch 210, or biometric information sensed by biometric sensors on smart watch 210.

Smart phone 220 may be configured to support wireless communication (e.g. cellular, Wi-Fi, Bluetooth, NFC, etc.) capabilities and data processing and memory abilities. The components of smart phone 220 may include one or more components described in computer 700 illustrated in FIG. 7. For example, smart phone 220 may include a camera, display, accelerometer, gyroscope, and one or more biometric sensors for sensing a biometric reading of the user (e.g., user's body temperature, user's heartbeat, etc.). A more detailed description of the components that may comprise smart phone 220 is provided below with reference to FIG. 7. When communication between wearable recording device 100 and smart phone 220 is established, wearable recording device 100 may receive data obtained by smart phone 220. For example, digital images or digital videos recorded by smart phone 220 may be transmitted to wearable recording device 100 and stored on a memory of wearable recording device 100. Wearable recording device 100 may also receive information obtained by smart phone 220 such as audio information obtained through a microphone on smart phone 220, acceleration information sensed by the accelerometer on smart phone 220, orientation information sensed by the gyroscope of the smart phone 220, or biometric information sensed by biometric sensors on smart phone 220.

When communication between wearable recording device 100 and secure server 240 is established via network 230, data being captured or received by wearable recording device may be uploaded to secure server 240 to be stored on a memory of secure server 240. For example, digital video recorded by camera unit 104 may be uploaded to secure serve 240 and stored on a memory of secure server 240. The components of secure server 240 may include one or more components described in the computer 700 illustrated in FIG. 7.

Communication between devices within the user-based network system 200 may be through any of a number of standard wireless communication protocols. For example, Bluetooth communication, RF communication, NFC communication, telecommunication network communication, or any other wireless mechanism may be used.

As described in greater detail below, the present disclosure describes wearable recording device 100 that supports real-time recording of objects and events occurring with a user's field of view. In order to maximize limited on-board memory storage capabilities, a data storage strategy is disclosed that allows for recording continuous video segments by utilizing data overwriting strategies to overwrite previously recorded video segments. However, the disclosure further discloses a data storage strategy that detects specific trigger events (e.g., sounds, objects, facial recognition, biometric readings, acceleration readings, orientation readings) during the recording of a video segment that may cause the video segment to be stored separately and saved from the overwriting feature. This allows for the smart conservation of memory and storage of video segments that may include significant events that warrant longer term data storage.

The video recording strategies, data storing strategies, and other related processes described herein may be implemented by a data storage strategy tool. The data storage strategy tool may be, for example, software, hardware, firmware, or some combination thereof, running on one or more of the devices that comprise the user-based network system 200 or secure server 240.

Figure 3:
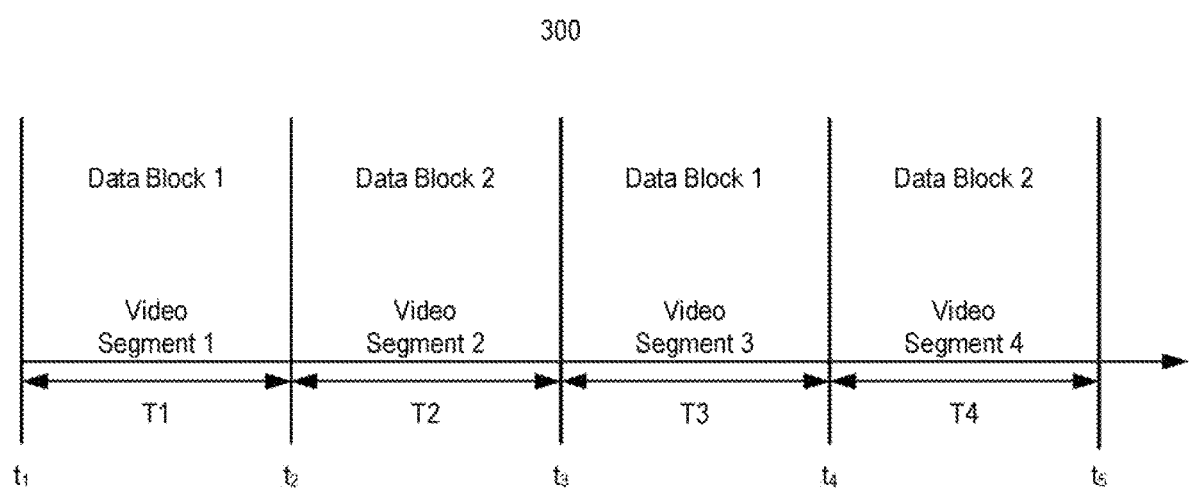
FIG. 3 illustrates a timeline describing video segment recording periods for the wearable recording device in FIG. 1, according to some embodiments.

FIG. 3 illustrates a timeline 300 describing a baseline data storage strategy for storing video segment recordings within a dedicated memory space. For purposes of describing the timeline 300, reference will be made to a video segment recorded by camera unit 104 of wearable recording device 100. Timeline 300 further assumes the video segment is stored on a memory of wearable recording device 100. However, it is within the scope of this disclosure for the video segment recordings to have been recorded by a camera unit of smart watch 210, a camera unit of smart phone 220, or a camera unit of another device having established communication with wearable recording device 100. In such embodiments, the video segment recordings may then be transmitted to wearable recording device 100 for viewing through display unit 103. It is also within the scope of this disclosure for the video segment recordings to be stored on another device in communication with wearable recording device 100 such as, for example, a memory of secured server 240, a memory of smart watch 210, or a memory of smart phone 220.

Referring back to timeline 300 illustrated in FIG. 3, data storage strategy tool may control the storage of continuously recorded video segments over a dedicated portion in memory such as a first data block 1 and a second data block 2. It follows that a first video segment 1 recording events occurring during a first time period T1 lasting from time $t_1$ to $t_2$, may be stored within a first data block 1. A subsequent second video segment 2 recording events occurring during a second time period T2 lasting from time $t_2$ to $t_3$, may be stored within a second data block 2, where second data block 2 is different from first data block 1.

A subsequent third video segment 3 recording events occurring during a third time period T3 lasting from time $t_3$ to $t_4$, may be stored to overwrite all, or substantially all, of the first video segment 1 by storing the third video segment 3 over first data block 1. Similarly, a subsequent fourth video segment 4 recording events occurring during a fourth time period T4 lasting from time $t_4$ to $t_5$, may be stored to overwrite all, or substantially all, of the second video segment 2 by storing the fourth video segment 4 over second data block 2. In this way, the data storage strategy tool is configured to overwrite previously recorded video segments as a strategy for efficiently conserving limited memory storage space. For example, due to the limits of on-board memory available on wearable recording device 100, without a data storage strategy that includes overwriting previously recorded video segments, the ability to continuously record video segments will be severely limited.

So with the data storage strategy described by timeline 300, video segments may continue to be recorded and stored, for at least a known period of time before it is overwritten. This enables the continuous recording of events occurring within the field of view of camera unit 104 while also limiting the memory dedicated to the storage of such video recording to a fixed (i.e., known) limit.

Each of the time periods T1-T4 may be designed to last the same length of time. For example, one or more of time periods T1-T4 may last for 15 minutes or some other predetermined length of time. Further, although timeline 300 is described to repeat the memory overwriting cycle to every two subsequent time periods, the data storage strategy tool may be configured to repeat the memory overwriting cycle according to other intervals. For example, the data storage strategy tool may control the memory overwriting cycle so that each subsequent video recording segment is stored to overwrite the previously recorded video segment.

The data storage strategy described by timeline 300 may be desirable and effective for continuously recording video segments that do not include a significant event that may be considered for more permanent storage. However, when a significant event (e.g., a predetermined trigger event) is detected during the recording of a video segment, a different data overwriting strategy may be desirable. Accordingly, the identification of a trigger event may initiate the data storage strategy tool to implement a trigger event protocol that may, for example, separately save a video segment lasting a predetermined length of time prior to the triggering event and/or lasting a predetermined length of time following the triggering event. In addition or alternatively, the identification of a triggering event may initiate the data storage strategy tool to continue recording the video segment past a default time period until a subsequent trigger event is detected. The timelines illustrated in FIGS. 4A-4C describe such data storage strategies that utilize data overwriting strategies that allow for separately storing video segments that include detected trigger events.

Figure 4A:
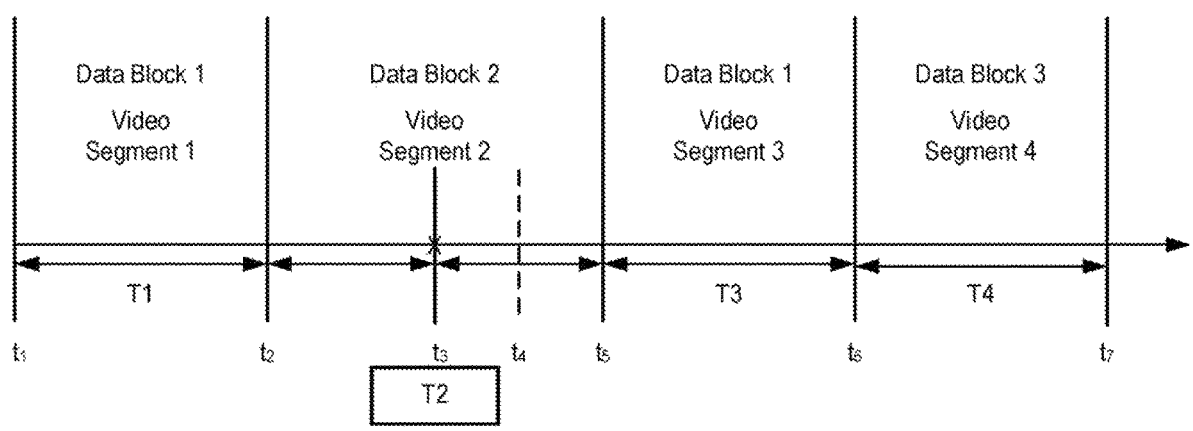
FIG. 4A illustrates a timeline describing video segment recording periods for the wearable recording device in FIG. 1, according to some embodiments.

FIG. 4A illustrates a timeline 410 describing a first data storage strategy implemented by the data storage strategy tool when a trigger event is detected while recording a video segment. The trigger event may be a predetermined sound or voice command recognized by a speech recognition device operated by the data storage strategy tool, a predetermined object recognized by a video recognition device operated by the data storage strategy tool, a predetermined person recognized by a facial recognition device operated by the data storage strategy tool, a predetermined gesture command recognized by a video recognition device operated by the data storage strategy tool, a predetermined user input command received via an input device and recognized by the data storage strategy tool, a predetermined acceleration measurement measured by an accelerometer and recognized by the data storage strategy tool, a predetermined orientation measurement detected by a gyroscope and recognized by the data storage strategy tool, a user's biometric reading obtained by one or more biometric sensors and recognized by the data storage strategy tool, or some other trigger event that may be detected by the data storage strategy tool from the current video segment being recorded. The detection of the trigger event may be accomplished by the data storage strategy tool running on the wearable recording device 100. Alternatively, the detection of the trigger event may be accomplished by the data storage strategy tool running, at least in part, on another device in communication with the wearable recording device 100 (e.g., smart watch 210, smart phone 220, or secure server 240).

According to the first data storage strategy, after a trigger event is detected, the data storage strategy tool may automatically save a first video portion lasting a first predetermined length of time prior to the trigger event. In addition or alternatively, after the trigger event is detected, the data storage strategy tool may automatically save a second video portion lasting a second predetermined length of time following the trigger event. The first predetermined length of time may be equal to the second predetermined length of time (e.g., 7.5 minutes). Alternatively, the first predetermined length of time may be different from the second length of time.

According to timeline 410, a first video segment 1 may be recorded to capture events occurring during a first time period T1 lasting from time $t_1$ to $t_2$. As illustrated in timeline 410, a trigger event is not detected during recording of the first video segment 1 during the first time period T1. Therefore, the data storage strategy tool controls storage of the first video segment 1 into a first data block 1.

Following storage of the first video segment 1 into first data block 1, the data storage strategy tool commences recording a second video segment 2 starting at time $t_2$. During the recording of the second video segment 2, a trigger event may be detected at time $t_3$. According to the first data storage strategy, the detection of the trigger event at time $t_3$ may automatically initiate the data storage strategy tool to save a first video portion of previously recorded video content that goes back a first predetermined length of time from the trigger event detection time at $t_3$. In addition or alternatively, according to the first data storage strategy the detection of the trigger event at time $t_3$ may also initiate the data storage strategy tool to continuing storing video content (i.e., a second video portion) following the detection of the trigger event at time $t_3$ for a second predetermined length of time. Timeline 410 illustrates the first predetermined length of time lasting from time $t_2$ to time $t_3$, and the second predetermined length of time lasting from time $t_3$ to time $t_5$. In the embodiment illustrated by timeline 410, the first predetermined time length is equal to the second predetermined time length. However, in alternative embodiments the first predetermined time length may be different from the second predetermined time length, where the first predetermined time length may be longer or shorter than the second predetermined time length.

So whereas the second video segment 2 may have lasted from time $t_2$ to time $t_4$ under the baseline data storage strategy described in timeline 300, because the trigger event was detected during the second time period T2 at time $t_3$ in timeline 410, the second video segment 2 is recorded from time $t_2$ to time $t_5$ according to the first data storage strategy. The combination of the first video portion (lasting from time $t_2$ to time $t_3$ prior to the trigger event) and the second video portion (lasting from time $t_3$ to time $t_5$ following the trigger event) may then be stored as second video segment 2 (i.e., trigger event video segment) into data block 2. Alternatively, according to some embodiments the first video portion may be stored as the second video segment 2 into data block 2. Alternatively, according to some embodiments the second video portion may be stored as the second video segment 2 into data block 2.

A subsequent third video segment 3 may be recorded to capture events occurring during a third time period T3 lasting from time $t_5$ to $t_6$. The data storage strategy tool allows the third video segment 3 to overwrite all, or substantially all, of the first video segment 1 by storing the third video segment 3 over first data block 1. The data storage strategy tool allows for first video segment 1 to be overwritten in first data block 1 because a trigger event was not detected in first video segment 1.

A subsequent fourth video segment 4 may be recorded to capture events occurring during a fourth time period T4 lasting from time $t_6$ to $t_7$. Whereas under the baseline data storage strategy described in timeline 300 the fourth video segment 4 was stored to overwrite second video segment 2 in second data block 2, because the trigger event was detected during the recording of the second video segment 2 in timeline 410, the data storage strategy tool will not overwrite the second video segment 2 in data block 2. Rather, the data storage strategy tool controls storage of the fourth video segment 4 into a third data block 3, where the third data block 3 may be different from the first data block 1 and/or second data block 2. In this way, the second video segment 2 including the trigger event will be saved from overwriting and preserved until a later action to overwrite it is taken.

Figure 4B:
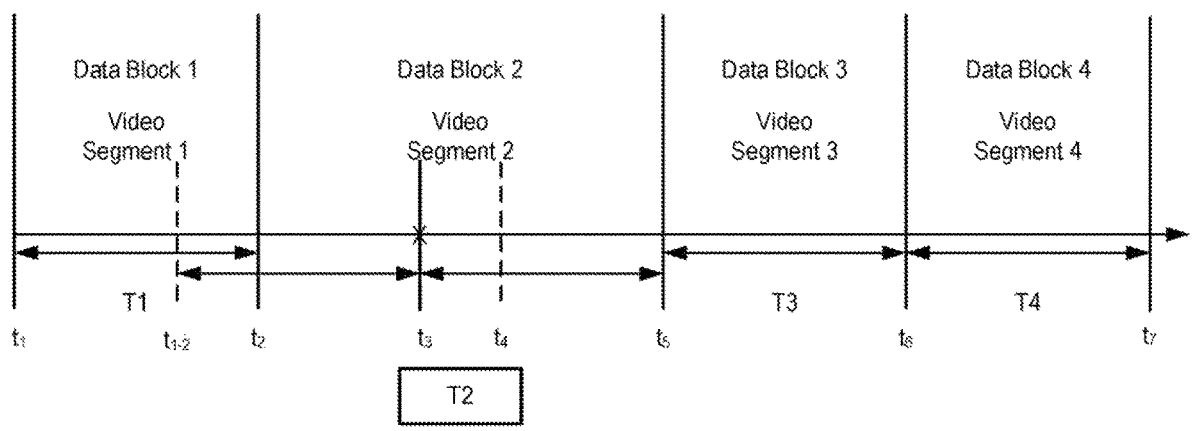
FIG. 4B illustrates a timeline describing video segment recording periods for the wearable recording device in FIG. 1, according to some embodiments.

FIG. 4B illustrates a timeline 420 describing a second data storage strategy implemented by the data storage strategy tool when a trigger event is detected while recording a video segment. The trigger event may be any one or more of the trigger events described herein.

According to the second data storage strategy, after a trigger event is detected, the data storage strategy tool may automatically save a first video portion lasting a first predetermined length of time prior to the trigger event. In addition or alternatively, after the trigger event is detected, the data storage strategy tool may automatically save a second video portion lasting a second predetermined length of time following the trigger event. The first predetermined length of time may be equal to the second predetermined length of time (e.g., 10 minutes). Alternatively, the first predetermined length of time may be different from the second length of time.

According to timeline 420, a first video segment 1 may be recorded to capture events occurring during a first time period T1 lasting from time $t_1$ to $t_2$. As illustrated in timeline 420, a trigger event is not detected during recording of the first video segment 1 during the first time period T1. Therefore, the data storage strategy tool controls storage of the first video segment 1 into a first data block 1.

Following storage of the first video segment 1 into first data block 1, the data storage strategy tool commences recording of a second video segment 2 starting at time $t_2$. During the recording of the second video segment 2, a trigger event may be detected at time $t_3$. According to the first data storage strategy, the detection of the trigger event at time $t_3$ may automatically initiate the data storage strategy tool to save a first video portion of previously recorded video content that goes back a first predetermined length of time from the trigger event detection time at $t_3$. In addition or alternatively, according to the first data storage strategy, the detection of the trigger event at time $t_3$ may also automatically initiate the data storage strategy tool to continuing storing video content (i.e., a second video portion) following the detection of the trigger event at time $t_3$ for a second predetermined length of time. Timeline 420 illustrates the first predetermined length of time lasting from time $t_{1-2}$ to time $t_3$, where time $t_{1-2}$ extends back into the first time period T1. The second predetermined length of time lasts from time $t_3$ to time $t_5$. In the embodiment illustrated by timeline 420 the first predetermined time length is equal to the second predetermined time length. However, in alternative embodiments the first predetermined time length may be different from the second predetermined time length, where the first predetermined time length may be longer or shorter than the second predetermined time length.

So whereas the second video segment 2 may have lasted from time $t_2$ to time $t_4$ under the baseline data storage strategy described in timeline 300, because the trigger event was detected during the second time period T2 at time $t_3$ in timeline 420, the second video segment 2 is recorded from time $t_{1-2}$ to time $t_5$ according to the second data storage strategy. The combination of the first video portion (lasting from time $t_{1-2}$ to time $t_3$ prior to the trigger event) and the second video portion (lasting from time $t_3$ to time $t_5$ following the trigger event) may then be stored as second video segment 2 (i.e., trigger event video segment 2) into data block 2. Alternatively, according to some embodiments the first video portion may be stored as the second video segment 2 into data block 2. Alternatively, according to some embodiments the second video portion may be stored as the second video segment 2 into data block 2.

A subsequent third video segment 3 may be recorded to capture events occurring during a third time period T3 lasting from time $t_5$ to $t_6$. The data storage strategy tool controls the storage of the third video segment 3 into a third data block 3. The third data block 3 may include portions of the first data block 1 that wasn't utilized to store portions of the second video segment (i.e., video segment where a trigger event was identified) as well as any additional data block portions to allow for storage of the third video segment 3. It follows that the data storage strategy tool allows the third video segment 3 to overwrite portions of the first video segment 1 that were not saved as part of the second video segment 2.

A subsequent fourth video segment 4 may be recorded to capture events occurring during a fourth time period T4 lasting from time $t_6$ to $t_7$. Whereas under the baseline data storage strategy described in timeline 300 the fourth video segment 4 was stored to overwrite second video segment 2 in second data block 2, because the trigger event was detected during recording of the second video segment 2 in timeline 420, the data storage strategy tool will not overwrite the second video segment 2 in data block 2. Rather, the data storage strategy tool controls storage of the fourth video segment 4 into a fourth data block 4, where the fourth data block 4 may be different from the first data block 1, second data block 2, and/or third data block 3.

Figure 4C:
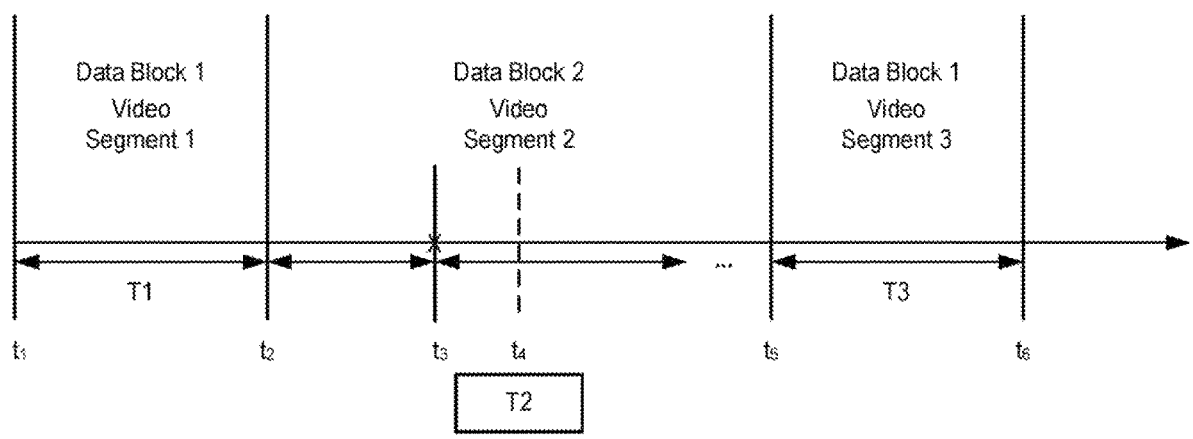
FIG. 4C illustrates a timeline describing video segment recording periods for the wearable recording device in FIG. 1, according to some embodiments.

FIG. 4C illustrates a timeline 430 describing a third data storage strategy implemented by the data storage strategy tool when a trigger event is detected while recording a video segment. The trigger event may be any one or more of the trigger events described herein.

According to the third data storage strategy, after a trigger event is detected, the data storage strategy tool may automatically save a first video portion lasting a first predetermined length of time prior to the trigger event. In addition or alternatively, after the trigger event is detected, the data storage strategy tool may automatically save a second video portion lasting from the trigger event at time $t_3$ until a subsequent trigger event is detected. The subsequent trigger event may be a predetermined sound or voice command recognized by a speech recognition device operated by the data storage strategy tool, a predetermined object recognized by a video recognition device operated by the data storage strategy tool, a predetermined person recognized by a facial recognition device operated by the data storage strategy tool, a predetermined gesture command recognized by a video recognition device operated by the data storage strategy tool, a predetermined user input command received via an input device and recognized by the data storage strategy tool, a predetermined acceleration measurement measured by an accelerometer and recognized by the data storage strategy tool, a predetermined orientation measurement detected by a gyroscope and recognized by the data storage strategy tool, a user's biometric reading obtained by one or more biometric sensors and recognized by the data storage strategy tool, or some other trigger event that may be detected by the data storage strategy tool from the current video segment being recorded. The detection of the subsequent trigger event may be accomplished by the data storage strategy tool running on the wearable recording device 100. Alternatively, the detection of the subsequent trigger event may be accomplished by the data storage strategy tool running, at least in part, on another device in communication with the wearable recording device 100 (e.g., smart watch 210, smart phone 220, or secure server 240).

According to timeline 430, a first video segment 1 may be recorded to capture events occurring during a first time period T1 lasting from time $t_1$ to $t_2$. As illustrated in timeline 430, a trigger event is not detected during recording of the first video segment 1. Therefore, the data storage strategy tool may control storage of the first video segment 1 into a first data block 1.

Following storage of the first video segment 1 into first data block 1, the data storage strategy tool commences recording a second video segment 2 starting at time $t_2$. During the recording of the second video segment 2, a trigger event may be detected at time $t_3$. According to the third data storage strategy, the detection of the trigger event at time $t_3$ may automatically initiate the data storage strategy tool to save a first video portion of previously recorded video content that goes back a first predetermined length of time from the trigger event detection time at $t_3$. In addition or alternatively, according to the third data storage strategy, the detection of the trigger event at time $t_3$ may also automatically initiate the data storage strategy tool to continuing storing video content (i.e., a second video portion) following the detection of the trigger event at time $t_3$ until a subsequent trigger event is identified. Timeline 430 illustrates the first predetermined length of time lasting from time $t_2$ to time $t_3$. Timeline 430 also illustrates the recording of the second video portion from the time of the trigger event detection at time $t_3$ and continuing until a subsequent trigger event is detected at time $t_5$. The subsequent trigger event may be any one or more of the subsequent trigger events described herein.

So whereas the second video segment 2 may have lasted from time $t_2$ to time $t_4$ under the baseline data storage strategy described in timeline 300, because the trigger event was detected during the second time period T2 at time $t_3$ in timeline 430, the data storage strategy tool's implementation of the third data storage strategy results in the second video segment 2 being recorded from time $t_2$ until the subsequent trigger event is detected at time $t_5$. The combination of the first video portion (lasting from time $t_2$ to time $t_3$ prior to the trigger event) and the second video portion (lasting from time $t_3$ to time $t_5$ following the trigger event) may then be stored as second video segment 2 (i.e., trigger event video segment) into data block 2. Alternatively, according to some embodiments the first video portion may be stored as the second video segment 2 into data block 2. Alternatively, according to some embodiments the second video portion may be stored as the second video segment 2 into data block 2.

A subsequent third video segment 3 may be recorded to capture events occurring during a third time period T3 lasting from time $t_5$ to $t_6$. The data storage strategy tool allows the third video segment 3 to overwrite all, or substantially all, of the first video segment 1 by storing the third video segment 3 over first data block 1. The data storage strategy tool allows for first video segment 1 to be overwritten in first data block 1 because a trigger event was not detected in first video segment 1.

Figure 5:
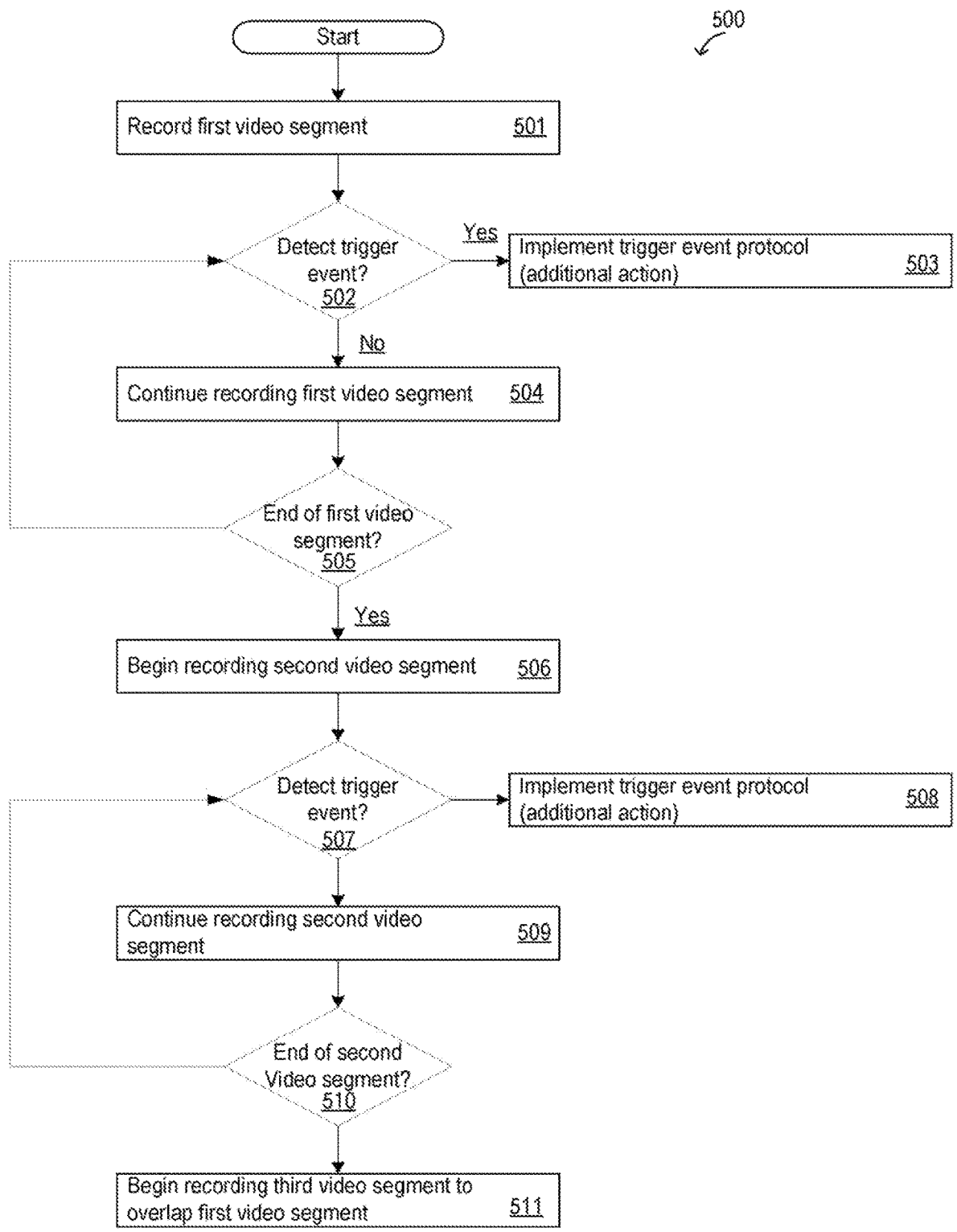
FIG. 5 illustrates a flowchart describing a data storage strategy for recording continuous video segments, according to some embodiments.

FIG. 5 illustrates flowchart 500 describing a data storage strategy process implemented by, for example, the data storage strategy tool described herein.

At 501, the data storage strategy tool may control recording to a first video segment into a first data block. The recording of the first video segment may correspond to any one of the processes for recording a first video segment described herein.

At 502, the data storage strategy tool determines whether a trigger event is detected during the recording of the first video segment. The detection of the trigger event may correspond to any of the processes for detecting a trigger event described herein. More particularly, 502 may include detecting a user input to the wearable recording device 100, and recognizing the manual input as a manual trigger event for identifying the trigger event. For example, during recoding of the first video segment, a user may input a command into wearable recording device 100 signaling that a trigger event has been manually detected.

In addition or alternatively, 502 may include detecting an object or person from the first video segment, and recognizing the detected object or person as a predetermined trigger event. For example, the user's child may be recognized during recoding of the first video segment, where the recognition of the user's child within a recorded video segment is known to be a predetermined trigger event. Similarly, a specific object such as a birthday cake or famous landmark may be recognized during recording of the first video segment, where recognition of special object within a recorded video segment is known to be a predetermined trigger event.

In addition or alternatively, 502 may include detecting an audible user command or sound, and recognizing the audible user command or sound as a predetermined trigger event. For example, a specific audible command such as "trigger event detected" from the user may be detected and recognized as a predetermined command for identifying a trigger event. In addition, a specific sound such as tires screeching, a baby's cry, a gunshot, or sirens may be detected and recognized as a predetermined trigger event.

In addition or alternatively, 502 may include detecting an acceleration, deceleration, and/or orientation measurement of wearable recording device 100 (or another device in communication with wearable recording device 100 as described herein), and recognizing the acceleration, deceleration, and/or orientation measurement as a predetermined trigger event. For example, detection of a sudden acceleration or deceleration may correspond to a traffic accident scenario, and therefore detection of a sudden acceleration or declaration may be recognized as a predetermined trigger event. In addition, a prolonged stillness (i.e., lack of acceleration, lack of deceleration, or no change in orientation) may correspond to a health issue where the user cannot move, and therefore detection of a prolonged stillness may be recognized as a predetermined trigger event.

In addition or alternatively, 502 may include detecting certain biometric levels and recognizing certain biometric levels as being predetermined trigger events. For example, if a high heartbeat is measured this may correspond to the user being in a stressful, or even dangerous situation. Therefore, the detection of certain biometric measurements that are known as being harmful to the user may be recognized as predetermined trigger events.

If a trigger event is detected at 502, then at 503 the data storage strategy implements a trigger event protocol. The recognition of a trigger event indicates that the current video segment being recorded will be saved rather than made available for overwriting by a subsequent video segment recording. The trigger event protocol may correspond to any one of the data storage strategies (i.e., data overwriting strategies) initiated by the data storage strategy based on the detection of a trigger event described herein.

In addition to the trigger event protocol, according to some embodiments an additional action may be implemented by the data storage strategy tool based on the type of trigger event that is recognized. For example, if the trigger event corresponds to a traffic accident scenario (e.g., sudden increase in acceleration or sudden deceleration), the data storage strategy tool may additionally control smart phone 220 to call a predetermined number (e.g., emergency contact identified in smart phone 220, known emergency services number). As another example, if the trigger event corresponds to a potentially harmful situation for the user, the data storage strategy tool may additionally control smart phone 220 to call a predetermined number (e.g., emergency contact identified in smart phone 220, known emergency services number) and/or control wearable recording device 100 to transmit the first video segment including the recognized trigger event to emergency services.

In addition to the trigger event protocol, according to some embodiments an additional action may be implemented by the data storage strategy tool based on the detection of the trigger event. For example, the detection of the trigger event may cause the data storage strategy tool to begin uploading or saving video data to a new remote system and/or database.

If a trigger event is not detected at 502, then at 504 the data storage strategy continues to record the first video segment.

At 505, the data storage strategy tool determines whether a recording period for the first video segment has ended. If it is determined that the recording period for the first video segment has ended, then at 506 the data storage strategy tool controls the recording of a second video segment. If it is determined that the recording period for the first video segment has not ended, then the data storage strategy tool may revert back to 502 to again determine whether a trigger event has occurred during the recording of the first video segment.

At 507, the data storage strategy tool determines whether a trigger event is detected during the recording of the second video segment. The detection of the trigger event may correspond to any of the processes for detecting a trigger event described herein.

If a trigger event is detected at 507, then at 508 the data storage strategy implements a trigger event protocol. The trigger event protocol may correspond to any one of the data storage strategies initiated by the data storage strategy based on the detection of a trigger event described herein.

If a trigger event is not detected at 507, then at 509 the data storage strategy continues to record the second video segment.

At 510, the data storage strategy tool determines whether a recording period for the second video segment has ended. If it is determined that the recording period for the second video segment has ended, then at 511 the data storage strategy tool controls the recording of a third video segment to overlap the first video segment, or some other previously recorded video segment. Controlling the recording of the third video segment to overlap a previously recorded video segment may correspond to any one of the data storage strategies (i.e., data overwriting strategies) initiated by the data storage strategy tool based on the detected of a trigger event described herein.

If it is determined that the recording period for the second video segment has not ended, then the data storage strategy tool may revert back to 507 to again determine whether a trigger event has occurred during the recording of the second video segment.

According to some embodiments, certain trigger events may be recognized as a command to cease recording of the current video segment being recorded, and/or deleting the current video segment being recording. For example, if an input prompt that asks for personal or private information (e.g., personal identification number (PIN), social security number, passwords, documents labeled as being confidential) is detected from the current video segment being recorded by a video recognition device, the data storage strategy tool may recognize this as a predetermined trigger event for ceasing the recording of the current video segment and/or deleting the current video segment recording. It follows that the recognition of such a predetermined trigger event will cause the data storage strategy tool to implement a trigger event protocol that ceases the recording of the current video segment and/or deletes the current video segment recording.

In addition, the user's location may be tracked via the wearable recording device 100 (or another device in communication with the wearable recording device), such that the detection of the user at certain predetermined locations (e.g., banks or other financial institutions) may be recognized by the data storage strategy tool as a trigger event for ceases the recording of the current video segment and/or deletes the current video segment recording.

In addition, facial recognition of certain predetermined people, or the audible recognition of certain people, may be recognized by the data storage strategy tool as a trigger event for ceases the recording of the current video segment and/or deletes the current video segment recording.

Figure 6A:
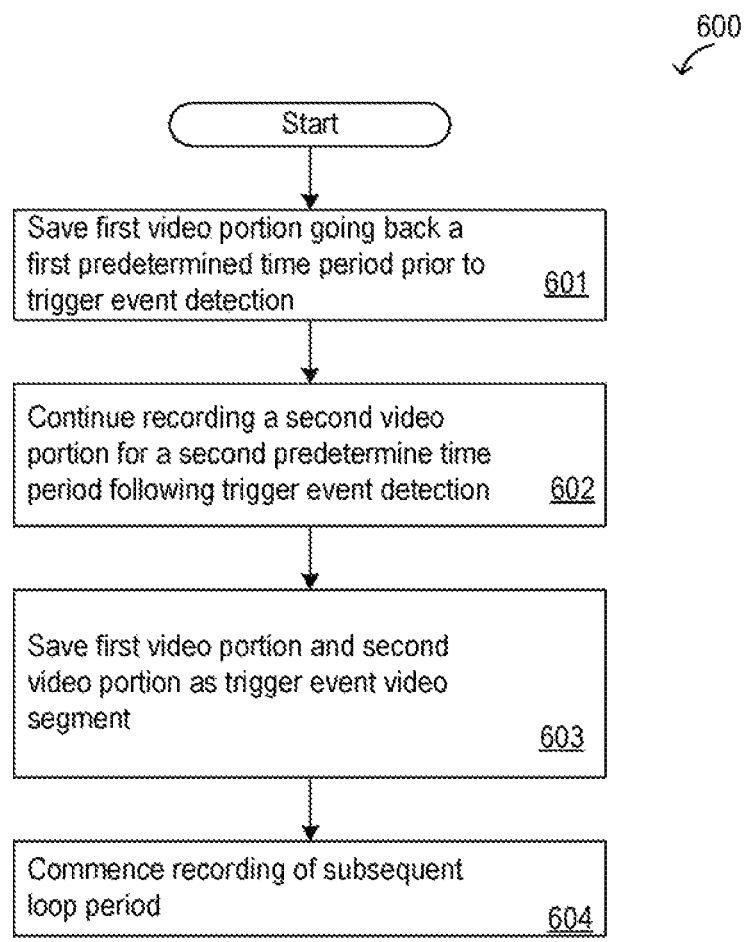
FIG. 6A illustrates a flowchart describing a trigger event protocol process for the wearable recording device in FIG. 1, according to some embodiments.

FIG. 6A illustrates a flowchart 600 that describes a trigger event protocol implemented, for example, at 503 and/or 508 in the process described by flowchart 500 in FIG. 5. The trigger event protocol described by flowchart 600 may be implemented by, for example, the data storage strategy tool described herein.

At 601, the data storage strategy tool may save a first video portion going back a first predetermined time period prior to the detection of a trigger event. The first video portion may go back into a previously recorded video segment, or the first video portion may go back to a time within the video segment currently being recorded.

At 602, the data storage strategy tool may continue to record and save a second video portion starting from the time when the trigger event was detected. The second video portion may continue to record for a second predetermined time period following the detection of the trigger event.

At 603, the data storage strategy tool may save the first video portion and the second video portion as a trigger event video segment. The data storage strategy tool may further control a data storage strategy to prevent future video segment recordings from overwriting the trigger event video segment for at least a predetermined time period or until a user provides instructions allowing for the overwriting of the trigger event video segment.

At 604, the data storage strategy tool may commence recording subsequent video segments according to any of the data storage strategies described herein.

Figure 6B:
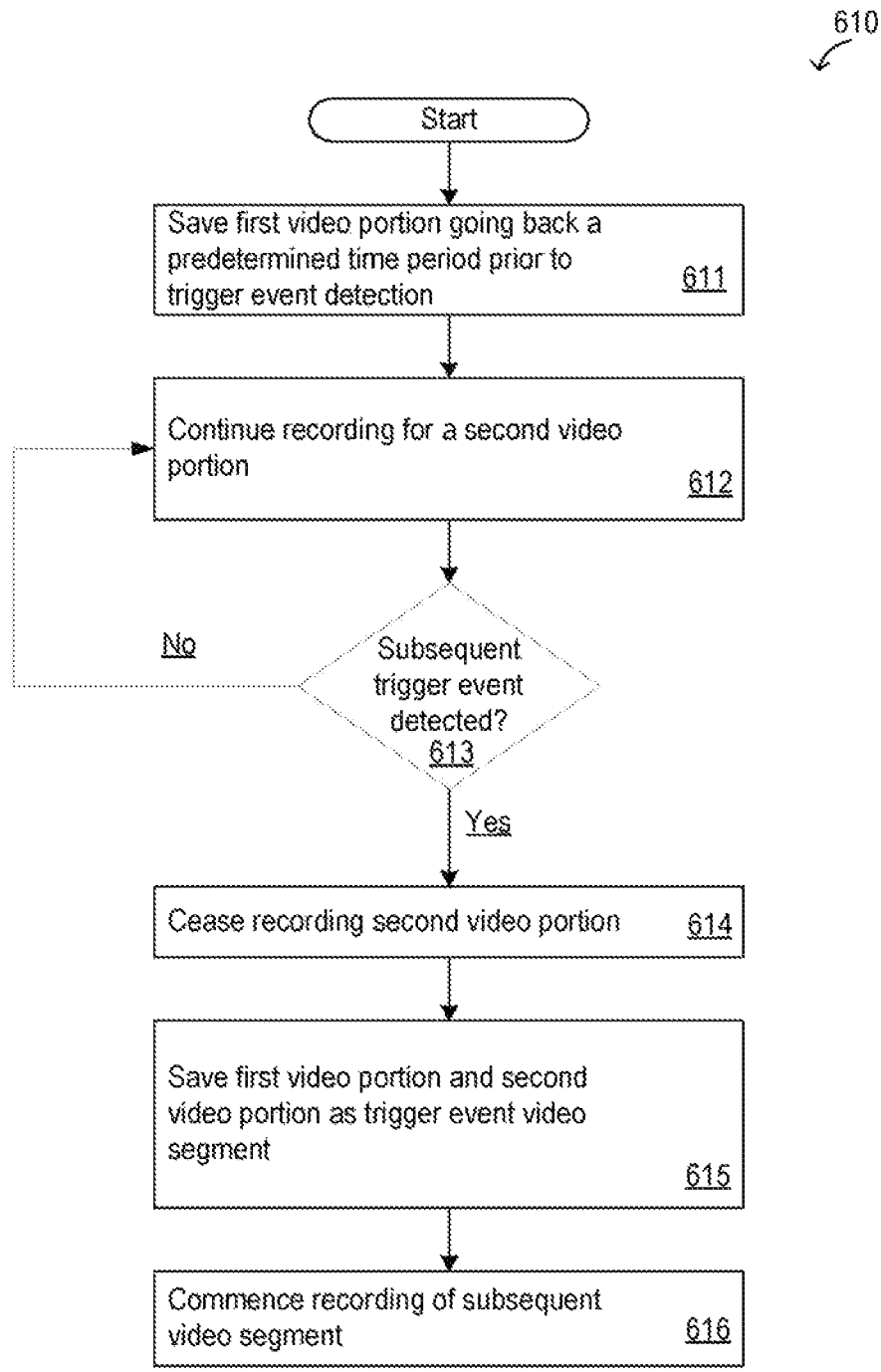
FIG. 6B illustrates a flowchart describing a trigger event protocol process for the wearable recording device in FIG. 1, according to some embodiments.

FIG. 6B illustrates a flowchart 610 that describes a trigger event protocol implemented, for example, at 503 and/or 508 in the process described by flowchart 500 in FIG. 5. The trigger event protocol described by flowchart 610 may be implemented by, for example, the data storage strategy tool described herein.

At 611, the data storage strategy tool may save a first video portion going back a predetermined time period prior to the detection of a trigger event. The first video portion may go back into a previously recorded video segment, or the first video portion may go back to a time within the video segment currently being recorded.

At 612, the data storage strategy tool may continue to record and save a second video portion starting from the time when the trigger event was detected. The second video portion may continue recording until a subsequent trigger event signifying the end to the significant event corresponding to the initial trigger event is detected.

So at 613, the data storage strategy tool determines whether the subsequent trigger event is detected. If the subsequent trigger event is detected, then at 614 the data storage strategy tool ceases recording the second video portion. However, if the subsequent trigger event is not detected, the data storage strategy tool may revert back to 612 and continue recording the second video portion.

At 615, the data storage strategy tool may save the first video portion and the second video portion as a trigger event video segment. The data storage strategy tool may further control a data storage strategy to prevent future video segment recordings from overwriting the trigger event video segment for at least a predetermined time period or until a user provides instructions allowing for the overwriting of the trigger event video segment.

At 616, the data storage strategy tool may commence recording subsequent video segments according to any of the data storage strategies described herein.

Although description has been provided for the data storage strategy tool controlling storage of video data (e.g., image and sound data), it is within the scope of this disclosure for the data storage strategy tool to control storage of additional data concurrently with the video data. For example, the data storage strategy tool may control storage of smell data, weather data, humidity data, gyroscope measurement data, and other sensor data obtained by sensors accessible by the data storage strategy tool according to any one or more of the data storage strategies described herein. Further, when the data storage strategy tool is configured to control the storage of video data and additional data, the data storage strategy tool may select which data to store and which data not to store in accordance to any one or more of the data storage strategies described herein.

Figure 7:
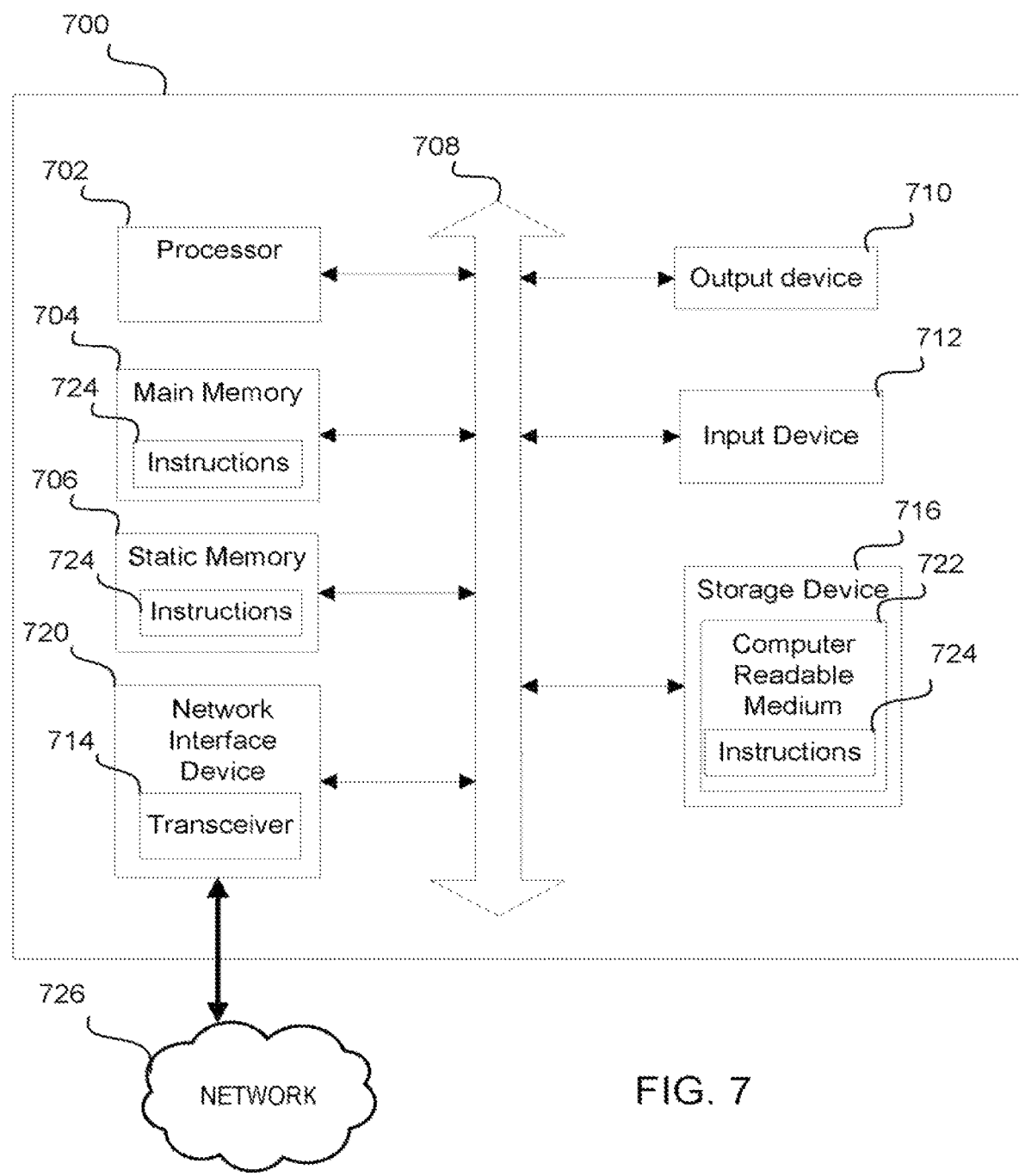
FIG. 7 illustrates a block diagram of an exemplary computer architecture for any of the devices in the system illustrated in FIG. 2.

Referring to FIG. 7, a block diagram is illustrated of an exemplary computer 700 configured to have an exemplary computer architecture in which embodiments and aspects of the wearable/portable/server devices described herein may be implemented. This computer 700 is only one example of a suitable computer architecture and is not intended to suggest any limitation as to the scope of use or functionality. Numerous other general purpose or special purpose computer architectures or configurations may be used. Examples of well known computing systems, environments, and/or configurations that may be suitable for use include, but are not limited to, smart phones, tablet computers, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

In one implementation, the wearable recording device 100, smart watch 210, or smart phone 220 may communicate directly with the secure server 240. In other implementations, the wearable recording device 100, smart watch 210, or smart phone 220 may communicate with the secure server 240 only after downloading an authenticating software application or token from the secure server 240. Thus, computer-executable instructions, such as program modules, being executed by a processor or other computing capability on one or more of the devices illustrated in the system of FIG. 2 may be used to implement the features described herein. Generally, program modules include routines, programs, objects, components, data structures, etc. that perform particular tasks or implement particular data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, each wearable recording device 100, smart watch 210, smart phone 220, or secure server 240 may be represented by a combination of one or more components that comprise computer 700. Computer 700 includes a network work interface 720 that enables communication with other computers via a network 726, where network 726 may be represented by network 230 in FIG. 2. The computer 700 may include a processor 702, a main memory 704, a static memory 706, the network interface device 720, an output device 710 (e.g., a display or speaker), an input device 712, and a storage device 716, all connected via a bus 708.

The processor 702 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 702 executes instructions and includes portions of the computer 700 that control the operation of the entire computer 700. The processor 702 may also represent a controller that organizes data and program storage in memory and transfers data and other information between the various parts of the computer 700.

The processor 702 is configured to receive input data and/or user commands from the input device 712. The input device 712 may be a keyboard, mouse or other pointing device, trackball, scroll, button, touchpad, touch screen, keypad, microphone, speech recognition device, video recognition device, or any other appropriate mechanism for the user to input data to the computer 700 and control operation of the computer 700 and/or operation of the data storage strategy tool described herein. Although only one input device 712 is shown, in another embodiment any number and type of input devices may be included. For example, input device 712 may include an accelerometer, a gyroscope, and a global positioning system (GPS) transceiver.

The processor 702 may also communicate with other computers via the network 726 to receive instructions 724, where the processor may control the storage of such instructions 724 into any one or more of the main memory 704, such as random access memory (RAM), static memory 706, such as read only memory (ROM), and the storage device 716. The processor 702 may then read and execute the instructions 724 from any one or more of the main memory 704, static memory 706, or storage device 716. The instructions 724 may also be stored onto any one or more of the main memory 704, static memory 706, or storage device 716 through other sources. The instructions 724 may correspond to, for example, instructions that make up the data storage strategy tool described herein.

Although computer 700 is shown to contain only a single processor 702 and a single bus 708, the disclosed embodiment applies equally to computers that may have multiple processors and to computers that may have multiple busses with some or all performing different functions in different ways.

The storage device 716 represents one or more mechanisms for storing data. For example, the storage device 716 may include a computer readable medium 722 such as read-only memory (ROM), RAM, non-volatile storage media, optical storage media, flash memory devices, and/or other machine-readable media. In other embodiments, any appropriate type of storage device may be used. Although only one storage device 716 is shown, multiple storage devices and multiple types of storage devices may be present. Further, although the computer 700 is drawn to contain the storage device 716, it may be distributed across other computers, for example on a server.

The storage device 716 may include a controller (not shown) and a computer readable medium 722 having instructions 724 capable of being executed by the processor 702 to carry out the functions as previously described herein with reference to the data storage strategy tool. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 716 may also contain additional software and data (not shown), which is not necessary to understand the other features.

Output device 710 is configured to present information to the user. For example, the output device 710 may be a display such as a liquid crystal display (LCD), a gas or plasma-based flat-panel display, or a traditional cathode-ray tube (CRT) display or other well-known type of display in the art of computer hardware. Accordingly, in some embodiments the output device 710 displays a user interface. In other embodiments, the output device 710 may be a speaker configured to output audible information to the user. In still other embodiments, any combination of output devices may be represented by the output device 710.

Network interface device 720 provides the computer 700 with connectivity to the network 726 through any suitable communications protocol. The network interface device 720 sends and/or receives data from the network 726 via a wireless or wired transceiver 714. The transceiver 714 may be a cellular frequency, radio frequency (RF), infrared (IR) or any of a number of known wireless or wired transmission systems capable of communicating with a network 726 or other computer device having some or all of the features of computer 700. Bus 708 may represent one or more busses, e.g., USB, PCI, ISA (Industry Standard Architecture), X-Bus, EISA (Extended Industry Standard Architecture), or any other appropriate bus and/or bridge (also called a bus controller).

Computer 700 may be implemented using any suitable hardware and/or software, such as a personal computer or other electronic computing device. In addition to the various types of wearable devices described herein, computer 700 may also be a portable computer, laptop, tablet or notebook computer, PDA, pocket computer, appliance, telephone, or mainframe computer. Network 726 may be any suitable network and may support any appropriate protocol suitable for communication to the computer 700. In an embodiment, network 726 may support wireless communications. In another embodiment, network 726 may support hard-wired communications, such as a telephone line or cable. In another embodiment, network 726 may support the Ethernet IEEE (Institute of Electrical and Electronics Engineers) 802.3x specification. In another embodiment, network 726 may be the Internet and may support IP (Internet Protocol). In another embodiment, network 726 may be a LAN or a WAN. In another embodiment, network 726 may be a hotspot service provider network. In another embodiment, network 726 may be an intranet. In another embodiment, network 726 may be a GPRS (General Packet Radio Service) network. In another embodiment, network 726 may be any appropriate cellular data network or cell-based radio network technology. In another embodiment, network 726 may be an IEEE 802.11 wireless network. In still another embodiment, network 726 may be any suitable network or combination of networks. Although one network 726 is shown, in other embodiments any number of networks (of the same or different types) may be present.

According to some embodiments, certain public use modes of the wearable recording device 100 in combination with at least one other wearable recording device 800 are disclosed. The wearable recording device 800 may include any combination of the components illustrated in FIG. 8, including arm portions 801, a computing system 802, a display unit 803, a camera unit 804, and lenses 805.

Figure 8:
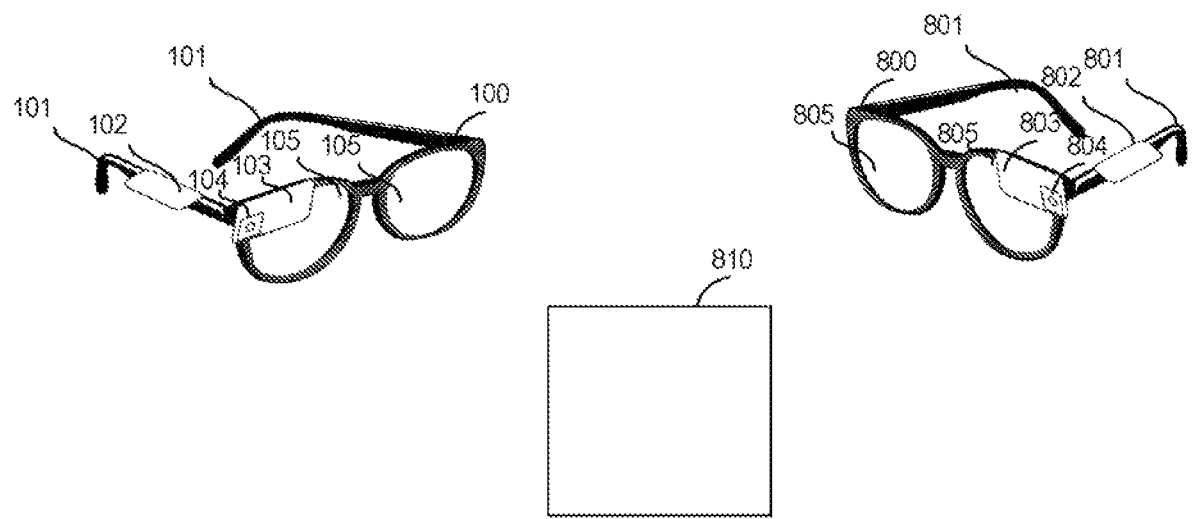
FIG. 8 illustrates an exemplary system including a plurality of wearable recording devices in which exemplary embodiments and aspects may be implemented.

In the party event scenario illustrated in FIG. 8 (e.g., a wedding), wearable recording device 100 and wearable recording device 800 may be handed out to multiple attendees of the party event to record and automatically share aspects of the same event from multiple perspective offered by the different recording locations of the different attendees. With wearable recording device 100 recording the same event (e.g., same object 810) as wearable recording device 800 from different locations, the video segments recorded by wearable recording device 100 and wearable recording device 800 may be centrally gathered combined to provide a unique, or at least clearer, view of the event. Assuming that both wearable recording device 100 and wearable recording device 800 are in communication with secure server 240, video segments recorded by both wearable recording device 100 and wearable recording device 800 may be uploaded to secure server 240. Secure server 240 may then combine the received video segments to generate a new video recording that includes portions from both video segments recorded by wearable recording device 100 and wearable recording device 800.

Another public use mode available when multiple wearable recording devices are communicating with each other may include a 3D capability for later viewing an event in three dimensions by combining the multiple different perspective views recorded by at least three different wearable recording devices of a same event. This may be a post processing procedure implemented by secure server 240 after receiving video segment recordings from at least three different wearable recording devices.

Another public use mode available when multiple wearable recording devices are communicating with each other may include the ability of, for example, wearable recording device 100 being able to view video being recorded by wearable recording device 800. The video being recorded by wearable recording device 800 may be transmitted to wearable recording device 100 and displayed on display unit 103 of wearable recording device 100. Similarly, video being recorded by wearable recording device 100 may be transmitted to wearable recording device 800 and displayed on display unit 803 of wearable recording device 800. In this way, a public use mode may allow a first wearable recording device to view video being recorded by another wearable recording device to provide different viewing perspectives of a common event. This public use mode may be useful to give users an option of switching to someone else's view replay if their own view is blocked.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be spread across a plurality of devices. Such devices might include personal computers, network servers, and handheld devices, for example.

What is claimed is:

1. An apparatus comprising:
   a memory configured to store video data; and
   a processing circuitry in communication with the memory, wherein the processing circuitry is configured to:
   control storage of the video data into a video segment on the memory;
   detect at least one of a predetermined acceleration or deceleration measured by a sensor as a first trigger event within the video data during storage of the video data into the video segment; and implement a first trigger event protocol in response to the detection of the at least one of the predetermined acceleration or deceleration measurement as the first trigger event to:

control storage, on the memory, of the video data into a first video portion, wherein the first video portion includes the at least one of the predetermined acceleration or deceleration measurement as the first trigger event; and flag the first video portion for preservation.

2. The apparatus of claim 1, wherein the processing circuitry is further configured to:

control storage, on the memory, of the video data into a second video portion;

detect a second trigger event during storage of the video data into the second video segment; and implement a second trigger event protocol to:

withhold storage, on the memory, of the video data into the first video portion based on the flag associated with the first video portion; and control storage, on the memory, of the video data to the second video portion, wherein the second video portion does not overlap with the first video portion.

3. The apparatus of claim 1, wherein the sensor is located in a wearable device.

4. The apparatus of claim 1, wherein the processor is configured to:

detect a passing of a predetermined length of time as an ending event; and cease storage of the video data in the first video portion based on the detected ending event.

5. The apparatus of claim 1, wherein the processor is configured to:

detect a command input received via an input device as an ending event; and cease storage of the video data in the first video portion based on the detected ending event.

6. The apparatus of claim 1, wherein the processor is further configured to implement the first trigger event protocol to:

flag video data preceding a predetermined length of time prior to the detection of the first trigger event for preservation as a preceding video portion on the memory.

7. The apparatus of claim 1, wherein the processor is further configured to implement the first trigger event protocol to:

continue flagging video data following a predetermined length of time after the detection of the ending event for preservation as a trailing video portion on the memory.

8. A method comprising:

storing, by a processing circuitry, video data into a video segment on a memory;

detecting, by the processing circuitry, at least one of a predetermined acceleration or deceleration measurement measured by a sensor as a first trigger event within the video data during storage of the video data into the video segment; and implementing, by the processing circuitry, a first trigger event protocol in response to the detection of the at least one of the predetermined acceleration or deceleration measurement as the first trigger event to:

control storage, on the memory, of the video data into a first video portion, wherein the first video portion includes the at least one of the predetermined acceleration or deceleration measurement as the first trigger event; and flag the first video portion for preservation.

9. The method of claim 8, further comprising:

controlling, by the processing circuitry, storage of the video data into a second video portion on the memory;

detecting, by the processing circuitry, a second trigger event during storage of the video data into the second video segment; and implementing, by the processing circuitry, a second trigger event protocol to:

withhold storage, on the memory, of the video data into the first video portion based on the flag associated with the first video portion; and control storage, on the memory, of the video data to the second video portion, wherein the second video portion does not overlap with the first video portion.

10. The method of claim 8, wherein the sensor is located in a wearable device.

11. The method of claim 8, further comprising:

detecting a passing of a predetermined length of time as an ending event; and ceasing storage of the video data of the first video portion based on the detected ending event.

12. The method of claim 8, further comprising:

detecting a command input received via an input device as an ending event; and ceasing storage of the video data of the first portion based on the detected ending event.

13. The method of claim 8, further comprising:

flagging, by the processing circuitry, video data preceding a predetermined length of time prior to the detection of the first trigger event for preservation as a preceding video portion on the memory.

14. The method of claim 8, further comprising:

continuing to flag, by the processing circuitry, video data following a predetermined length of time after the detection of the ending event for preservation as a trailing video portion on the memory.

15. A non-transitory device readable storage medium configured to store executable instructions that, when executed by processing circuitry, cause the processing circuitry to:

control storage of video data into a video segment on a memory;

detect at least one of a predetermined acceleration or deceleration measurement measured by a sensor as a first trigger event within the video data during storage of the video data into the video segment; and implement a first trigger event protocol in response to the detection of the at least one of the predetermined acceleration or deceleration measurement as the first trigger event to:

control storage, on the memory, of the video data into a first video portion, wherein the first video portion includes the at least one of the predetermined acceleration or deceleration measurement as the first trigger event; and flag the first video portion for preservation.

16. The non-transitory device readable storage medium of claim 15, further configured to store executable instructions that, when executed by processing circuitry, cause the processing circuitry to:

control storage, on the memory, of the video data into a second video portion;

detect a second trigger event during storage of the video data into the second video segment; and implement a second trigger event protocol to:
withhold storage, on the memory, of the video data into the first video portion based on the flag associated with the first video portion; and control storage, on the memory, of the video data to the second video portion, wherein the second video portion does not overlap with the first video portion.

17. The non-transitory device readable storage medium of claim 15, further configured to store executable instructions that, when executed by processing circuitry, cause the processing circuitry to:

flag video data preceding a predetermined length of time prior to the detection of the first trigger event for preservation as a preceding video portion on the memory.

18. The non-transitory device readable storage medium of claim 15, further configured to store executable instructions that, when executed by processing circuitry, cause the processing circuitry to:

continue to flag, by the processing circuitry, video data following a predetermined length of time after the detection of the ending event for preservation as a trailing video portion on the memory.

19. The non-transitory device storage medium of claim 15, wherein the sensor is located in a wearable device.

* * * * *